US007299156B2

(12) United States Patent
Tsung et al.

(10) Patent No.: US 7,299,156 B2
(45) Date of Patent: Nov. 20, 2007

(54) METHOD FOR ESTIMATING A MAINTENANCE DATE AND APPARATUS USING THE SAME

(75) Inventors: Cheng Kuo Tsung, Hsinchu (TW); Tseng Tse Ming, Hsinchu (TW); Hu Chih Feng, Hsinchu (TW); Yeh Ming Chao, Hsinchu (TW); Ho Tsung Hsuan, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 11/503,518

(22) Filed: Aug. 10, 2006

(65) Prior Publication Data

US 2007/0021943 A1    Jan. 25, 2007

Related U.S. Application Data

(63) Continuation-in-part of application No. 10/764,747, filed on Jan. 26, 2004, now abandoned.

(51) Int. Cl.
*G06F 11/30* (2006.01)

(52) U.S. Cl. .................................... 702/184

(58) Field of Classification Search ............... 702/181, 702/184, 177, 189; 706/45; 187/316; 701/29, 701/54
See application file for complete search history.

(56) References Cited

U.S. PATENT DOCUMENTS 6,735,549 B2 *   5/2004   Ridolfo ................. 702/181
2003/0217894 A1 * 11/2003   Perala et al. ........... 187/316

* cited by examiner

*Primary Examiner*—Bryan Bui
*Assistant Examiner*—Xiuqin Sun
(74) *Attorney, Agent, or Firm*—Stout, Uxa, Buyan & Mullins, LLP

(57) ABSTRACT

A method for estimating maintenance dates includes steps of obtaining one or more differences between detected values and maintenance values of parameters, and determining whether the differences are beyond predefined values. The method further includes a step of implementing or recommending an initiation of maintenance if any of the differences are beyond their respective predefined values. The method also includes a step of estimating the maintenance date according to the differences and variation values representing changes of the parameter per time unit for the tool, if none of the differences are beyond their respective predefined values. An apparatus for estimating maintenance date in this fashion is also presented. The apparatus includes a controller, a database, and a connection unit.

22 Claims, 32 Drawing Sheets

FIG. 6

| EQUIPMENT NAME | PM PERIOD | PM STATUS | FIRST PM DATE | |
|---|---|---|---|---|
| XX | XX | XXXX | XXXX | |
| K1 | X | XX | | ... |
| K2 | X | XX | | ... |
| K3 | X | XX | | ... |
| K4 | X | XX | | ... |
| RCA-6 | X | XX | | ... |
| RCA-7 | X | XX | | ... |
| TW-1 | X | XX | | ... |
| TW-1 | X | XX | | ... |
| WET SCRUBBER-5 | X | XX | | ... |
| WET SCRUBBER-5 | X | XX | | ... |

EX. EQUIPMENT (TW-1) HAS A NEW MONTHLY MAINTENANCE. USERS CAN SET THE FIRST PM DATE IN THIS FUNCTION.

IN THIS FUNCTION
USER CAN ASSIGN FIRST MAINTENANCE DAY FOR EACH EQUIPMENT, AND THE SYSTEM WILL ADD THIS PM TO PM SCHEDULING PLAN.

| XXXX : 403-3 | | XXXXXX-X | | | | |
|---|---|---|---|---|---|---|
| PM PERIOD | PM DATE | NEW PM DATE | | TOLERANCE | DELETE? | REASON | REMARK |
| XX | XXXX | XXXX | | | XX | XX | XX |
| X03 | 2002/8/20 | | ... | 121 | ☑ | 1-XXXX | |
| X01 | 2003/2/17 | | ... | 121 | ☐ | | |
| X04 | 2002/11/18 | | ... | 121 | ☐ | | |
| X | 2003/2/27 | | ... | 121 | ☐ | | |
| X02 | 2003/5/6 | | ... | 121 | ☐ | | |

IN THIS CASE:
THE EQUIPMENT (403-3) WILL BE MODIFIED
THE PM DATE FROM 2002/8/20 TO
200/8/31.
AND THE REASON IS 1-PRODUCTIVE NEED.

| XXXX | XXXX ▷ | ⊙ XXXX | | ○ BY XX | XX XX XX | | VARIATION XX X | VARIATION (7 TIMES) XXX XXX X | ▷ | | |
|---|---|---|---|---|---|---|---|---|---|---|---|
| EQ NAME | APERIODIC ITEM | LOW LIMIT XX XX | UP LIMIT XX XX | CURRENT VALUE XX X | UPDATED TIME | STATUS | | DIR. | UNIT | AUTO. | FORM NO |
| 403-1 | RF TIME(VIA) | 27 | 33 | 0 | 2002/07/30 18:33 | | 10 | 139.4 | + | X N | P1112D |
| 403-1 | RF TIME(ZERO) | 5500 | 6500 | 4421 | 2002/08/08 17:52 | | 500 | 443.89 | + | X N | P1112D |
| 403-2 | RF TIME(VIA) | 27 | 33 | 0 | 2002/07/30 18:33 | | 10 | 45.6 | + | X N | P1112D |
| 403-2 | RF TIME(ZERO) | 5500 | 6500 | 4555 | 2002/08/08 17:52 | | 500 | 393.44 | + | X N | P1112D |
| 403-3 | RF TIME(VIA) | 27 | 33 | 20 | 2002/07/30 18:33 | | 10 | 4.67 | + | X N | P1112D |
| 403-3 | RF TIME(ZERO) | 5500 | 6500 | 0 | 2002/08/08 17:52 | | 500 | 0 | + | X N | P1112D |
| 403-4 | RF TIME(VIA) | 27 | 33 | 7 | 2002/07/30 18:33 | | 10 | 1.56 | + | X N | P1112D |
| 403-4 | RF TIME(ZERO) | 5500 | 6500 | 0 | 2002/08/08 17:52 | | 500 | 50.71 | + | X N | P1112D |

*FIG. 14*

PERIODIC MAINTENANCE SHEET MANAGEMENT

XX : BOXCLEAN

SEARCHING CRITERIA

| | PM SHEET NO XXXX X | PM PERIOD XXXX | DEFAULT PM DAY XXXX | MODIFIED PM DAY XXXXX | ACTUAL PM DAY XXXXX | STATUS XXXX | COSIGNING XXXX |
|---|---|---|---|---|---|---|---|
| 1 | 36764 | MONTHLY PM | 2002/03/30 | | | | |
| 2 | 12821 | X | 2001/12/03 | | 2001/12/03 | NOT OK | OK |
| 3 | 13326 | WEEKLY PM | 2001/12/10 | | 2001/12/10 | XX | XXXX |
| 4 | 13375 | X | 2001/12/17 | | 2001/12/13 | XX | XXXX |
| 5 | 13627 | X | 2001/12/24 | | 2001/12/24 | XX | NONE |
| 6 | 17419 | X | 2002/03/29 | 2002/04/25 | 2002/04/25 | XX | XXXX |
| 7 | 19071 | X | 2002/05/25 | 2002/05/23 | 2002/05/23 | XX | XXXX |
| 8 | 22928 | X | 2002/06/22 | 2002/06/24 | 2002/06/24 | XX | XXXX |
| 9 | 29463 | X | 2002/07/24 | 2002/07/31 | 2002/07/31 | XX | XXXX |

FIG. 17

APERIODIC MAINTENANCE SHEET MANAGEMENT

XX : CVD06#1

XX    XXX    X
XXXXX    FORECASTED    MODIFIED    ACTUAL
                PM DAY    PM DAY    PM DAY

SEARCHING CRITERIA: XX

| | PM SHEET NO. | APERIODIC ITEM | PM DAY (Forecasted) | PM DAY (Modified) | PM DAY (Actual) | STATUS | COSIGNING |
|---|---|---|---|---|---|---|---|
| 1 | 36764 | 3000 PCS. MAINTENANCE | 2002/08/07 XXXX X | | | NOT | |
| 2 | 27971 | 1000 PCS. MAINTENANCE | 2002/08/07 | 2002/07/25 XXXX XX | | NOT | |
| 3 | 28354 | 10000XXX | 2002/08/29 | | 2002/07/21 XXXX X | XXXX | |
| 4 | 26208 | 10000XXX | 2002/07/21 | | | OK | NONE |

ABNORMAL MAINTENANCE SHEET MANAGEMENT

XX : IMC02 xxxx  xxx   xxx
xxxx  xxxxx   (YYY/MM/DD)  x 2002/8/1
                            x 2002/8/10

SEARCHING CRITERIA: xx

⇩ X-X   ⇧ X-X

| PM SHEET NO. | ABNORMAL ITEM | PM DAY | STATUS | COSIGNING |
|---|---|---|---|---|
| 1 | 28103 | FILAMENT BROKEN | 2002/08/04 | XX | XXXX |
| 2 | 28315 | FILAMENT BROKEN | 2002/08/04 | XX | XXXX |
| 3 | 28318 | FILAMENT BROKEN | 2002/08/08 | XX | XXX |

PM OCAP SHEET MANAGEMENT

XX : ETCH

SEARCHING CRITERIA (YYY/MM/DD)

| | PM SHEET NO. | PM TYPE | PM NAME | EQ. NAME | USER | DATE | STATUS | COSIGNING |
|---|---|---|---|---|---|---|---|---|
| 1 | 18963 | XXXX | MONTHLY1 | STRIP-3 | XXX | 2002/04/23 | XX | XXXX |
| 2 | 20012 | XXXX | MONTHLY3 | STRIP-3 | XXX | 2002/05/10 | XX | XXXX |
| 3 | 21834 | XXXX | MONTHLY4 | PSC-8 | XXX | 2002/05/23 | XX | XXXX |
| 4 | 27145 | XXXX | XX | SINREM-1 | XXX | 2002/06/11 | XX | XXXX |
| 5 | 26342 | XXXX | X | HP-4 | XXX | 2002/07/01 | XX | XXXX |
| 6 | 26728 | XXXX | XX | CR-3 | XXX | 2002/07/01 | XX | XXXX |
| 7 | 31178 | XXXX | X | UV-3 | XXX | 2002/07/02 | XX | XXXX |
| 8 | 31374 | XXXX | RF TIME | P5000-1B | XXX | 2002/07/04 | XX | XXXX |
| 9 | 31375 | XXXX | RF TIME | P5000-5A | XXX | 2002/07/04 | XX | XXXX |
| 10 | 31378 | XXXX | RF TIME | P2000-4B | XXX | 2002/07/04 | XX | XX |
| 11 | 35273 | XXXX | XX | CR-3 | | | XXXX | |

| NO. | SIGN NO | EQ. NAME | SIGNED TYPE | NOTICE TIME | AUTHOR | SIGNER | SIGNER AGENT |
|---|---|---|---|---|---|---|---|
| 1 | 582 | THM21 | PERIODIC PM-MONTHLY | 2002/03/04 09:40:17 | XXX | XXX | |
| 2 | 5382 | CLM01 | XXXX - XX | 2002/07/27 13:53:48 | XXX | XXX | |
| 3 | 5527 | CLM01 | XXXX - XX | 2002/08/05 11:34:20 | XXX | XXX | |
| 4 | 5485 | GAT02 | XXXXX - XX | 2002/08/01 08:46:46 | XXX | XXX | |
| 5 | 5402 | IHC02 | XXXXX - FILAMENT BROKEN | 2002/07/28 07:26:07 | XXX | XXX | |
| 6 | 5622 | IMC01 | XXXXX - FILAMENT BROKEN | 2002/08/09 08:36:46 | XXX | XXX | |
| 7 | 5623 | IMC02 | XXXXX - FILAMENT BROKEN | 2002/08/09 08:37:47 | XXX | XXX | |
| 8 | 5624 | IMC08 | XXXXX - FILAMENT BROKEN | 2002/08/09 08:38:43 | XXX | XXX | |
| 9 | 5625 | IMC10 | XXXXX - FILAMENT BROKEN | 2002/08/09 08:39:52 | XXX | XXX | |

FIG. 25

| PM OI VERSION REVISED DATA IN THE FIM-EIM SYSTEM | | | | | | | |
|---|---|---|---|---|---|---|---|
| XX FACTORY FAB1 | | XXXX PM OI | | | ADT P5000 PASSVIATION | | |
| XX VER. 9 -> 10 | | XXXX STATUS | | | XXX-ECR | | |
| | | XXXXXX : XXXXXXXXX, XXXXXXXXX | | | | | |
| 1. XXXX | | | XXXX | | | | |
| 2. XX | STATUS | PM PERIOD | EQ NAME | PM FORM NO | PERIOD DAY | REF. PROCEDURE | REMARK |
| | XXXX | XX | XX | XXXX | XXXX | XXXXXX | XX |
| | XX | XX 1 | ADT-1 | P1416K | | | |
| | XX | XX 1 | ADT-2 | P1416K | | | |
| | XX | XX 1 | ADT-3 | P1416K | | | |
| | XX | XX 1 | ADT-6 | P1416K | | | |
| | XX | XX 1 | ADT-7 | P1416K | NEW ITEMS IN NEW VER. | | |
| | XX | XX 1 | ADT-10 | P1416K | | | |
| | XX | XX 1 | ADT-13 | P1416K | | | |
| | XX | XX 1 | ADT-15 | P1416K | | | |
| 3. XXXX | XX | XX 1 | ADT-17 | P1416K | | | |
| PERIODIC PM | XX | XX 2 | ADT-1 | P1416K | | | |
| | XX | XX 2 | ADT-2 | P1416K | | | |
| | XX | XX 2 | ADT-3 | P1416K | | | |
| | XX | XX 2 | ADT-6 | P1416K | | | |
| | XX | XX 2 | ADT-7 | P1416K | REMOVED ITEMS IN OLD VER. | | |
| | XX | XX 2 | ADT-10 | P1416K | | | |
| | XX | XX 2 | ADT-13 | P1416K | | | |
| | XX | XX 2 | ADT-15 | P1416K | | | |
| | XX | XX 2 | ADT-17 | P1416K | | | |

REMOVE QUARTERLY PM2 ADT-13 P1416K

IN THIS CASE
THE OI (ADT P5000 PASSVIATION) HAD BEEN REVISED FROM VER. 9 TO VER. 10. AND THE "QUARTERLY PM2" OF THE PERIODIC PM FOR ADT-13 HAD BEEN REMOVED IN THIS VERSION. WHEN THIS CASE IS APPROVED, THE TEMS SYSTEM WILL AUTOMATICALLY REMOVE THE "QUARTERLY PM2" OF ADT-13.

PM SCHEDULING PLAN    XX  XX    X - X

O XXXX  O XXXXX  ⊙ XX  [2003 X 9 XX ▽] [XX] (XXXXXXXXXX)    STOP
XXX

| EQUIPMENT | PM PERIOD | X X | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| ADT-13 | X (30) | 10 | | | | | | | X | | | | | | | | | | | | | | | | | | | | | | | |
| ADT-13 | XX 1 (30) | 0 | | X | | | | | | | | | | | | | | | | | | | | | | | | | | | | |
| ADT-13 | XX2 (1) | 0.5 | | | | | | | | | | | | | | | | | | | | | | | | | | | | | X | |

QUARTERLY PM2

FIG. 29

THE FORECASTING SCHEDULE OF ADT-13'S "QUARTERLY PM2" HAS BEEN STOP IN THE TEMS SYSTEM

IN THIS CASE
THE VALUE OF ITEM 11 IS 20> THE VALUE OF UP LIMIT (VALUE IS 18), THE SYSTEM CREATE A PM OCAP SHEET FOR THIS ITEM AUTOMATICALLY.

IN THIS CASE
WHEN THE VALUE OF MAINTENANCE ITEMS IS OUT OF SPEC., THE SYSTEM WILL AUTOMATICALLY CREATE A PM OCAP SHEET. USER MUST RECORD THE ACTION PROCESS AND ITEM VALUE AFTER MAINTAINING.

METHOD FOR ESTIMATING A MAINTENANCE DATE AND APPARATUS USING THE SAME

CROSS-REFERENCE TO RELATED APPLICATIONS

This application is a continuation in part of U.S. application Ser. No. 10/764,747, filed Jan. 26, 2004 now abandoned, the entire contents of which are hereby incorporated by reference.

BACKGROUND OF THE INVENTION

1. Field of the Invention

The present invention relates generally to semiconductor fabrication systems and, more particularly, to integrated maintenance scheduling systems.

2. Description of Related Art

Equipment used in the semiconductor manufacturing industry can be extremely expensive and complicated. Engineers must typically execute preventive maintenance (PM) by following standard operation procedures (SOPs) to ensure reliability and stability of the manufacturing equipment. Because of the wide variety and large numbers of equipment, managing the maintenance of equipment manually can be inefficient. Mistakes arising from manual management as well as any lack of completion of the required maintenance procedures can cause equipment failure and can delay schedules of production, thus decreasing enterprise profits.

Manual processes of implementing PM have included paper documents or application software on the managers' personal computers for carrying out the various periodic or aperiodic maintenance plans for all equipment. The engineers, in turn, would execute the maintenance according to the maintenance plans. The maintenance plan typically consisted of preparing the PM sheet that described the maintenance items and of executing the items on the PM sheet. When the engineer completed the maintenance, the engineer would record the data on the PM sheet and send the PM sheet to the manager for review and cosigning. Finally, the engineer would put the PM sheet into a folder as a reference record. When the result of a maintenance item was a failure, the engineer would fill in an Out of Control Active Process (OCAP) provision on the PM sheet.

Many undesirable traits can be associated with the aforementioned manually driven processes. Without integrating with other computerized information systems, it is easy to get data inconsistencies that can affect the quality of maintenance. Moreover, manual processes can be time-consuming. Most equipment has an interface that a PC user can use to communicate with the equipment and get the parameters of the equipment. The parameters of the equipment can be key factors in determining whether or not to execute the maintenance. Maintaining equipment requires time of an engineer for approaching the equipment, for recording parameters, and furthermore can require time for correcting manual data errors that may occur by the engineer during for example the recording. Also, when the maintenance period and specification of the maintenance item is changed, the manager must update the plan of maintenance and the PM sheet; otherwise, the data on the plan of maintenance and the PM sheet may be inconsistent. It is also inefficient for the manager to manually re-schedule all plans of maintenance for such a change. Much time and effort would be invested into manually coordinating the new maintenance requirements with production needs. When for example a manager tries to execute a new plan of maintenance, all engineers must update the maintenance status immediately upon performing the maintenance. Manual management can create inconsistencies between the original plan and the actual result.

Any equipment requiring aperiodic maintenance must be effectively managed to make sure all maintenance will be carried out. Maintenance may be forgotten and the maintenance plan may not be carried out. Under these conditions, the reliability and stability of equipment can be uncertain.

Furthermore, manual management and paper work can waste manpower and paper. Employees using manual management can expend too much effort and waste too much paper in recording maintenance data. Moreover, the paper documents can be difficult to store, query, and analyze. Paper data cannot be effectively used to improve the future maintenance parameters. After a tool is checked and the examiner obtains parameters, the examiner judges whether the tool needs to be maintained. Therefore, there is no schedule for this kind of irregular tool maintenance.

A need thus exists in the prior art to determine the maintenance date for an irregular tool based upon its varying real-time parameters. A further need exists for the automation of the parameter data collection, the calculation of the maintenance date, and the entry of the maintenance date into the maintenance schedule.

SUMMARY OF THE INVENTION

In order to address the aforementioned problems, a powerful and user-friendly web-based Total Equipment Management System (TEMS) has been discovered. The system integrates with other computerized information systems and simplifies the process of maintenance. TEMS can ensure that the maintenance will be completed and that the maintenance is of an optimal quality. The system includes a variant type of maintenance management to ensure the reliability and stability of equipment. Through use of the system, the maintenance date of an irregular tool is estimated by those who check the tool each day or once every several days.

For the purpose of decreasing maintenance issues, a powerful and user-friendly management system of preventive maintenance has been developed. The system integrates data of other information systems, and applies domain knowledge and professional methodology. The system supports dynamic forecasting of preventive maintenance (PM) dates and automatic alerting to improve the efficiency of management, to carry out all maintenance, and to ensure the reliability and stability of equipment. After integrating and analyzing the PM sheet that is stored in the system, the system can quickly and accurately provide managing reports and alerting reports. The system can also reuse data and improve the value of the data. Integrating with computerized equipment systems can eliminate the time it takes an engineer to approach the equipment, the time it takes to record parameters, and manual data errors that can occur by the engineer during recording. Also, when the maintenance period and specification of the maintenance item has changes, the manager can simultaneously update the plan of maintenance and the PM sheet; otherwise, the data on the plan of maintenance and the PM sheet can be inconsistent.

The present invention provides two methods for estimating maintenance date and an apparatus using the same. The first method introduces a variation value, which is calculated from parameters obtained from a tool for several days or is inputted by users, into a scheduling procedure. The method then estimates the maintenance date according to a present obtained parameter and the variation value. The maintenance date of the irregular tools is estimated by using a variation value calculated from the parameters of the irregular tools obtained several days before. The variation value is obtained, in other words, by a statistical method. Therefore, the maintenance date can be estimated, and the procedure for maintenance can be set.

The second method is similar to the first method, except that more than one parameter is tracked to determine maintenance date. Each parameter has its own variation value. The maintenance date is determined via calculations with a variation value for each parameter.

A third embodiment of the present invention provides an automated system for obtaining tool information and using this information to calculate a best estimate for a maintenance date. The automated system employs methods of calculating a maintenance date as presented in the first and second embodiments of this invention. The automated system comprises a connecting unit, a controller, and a database.

Any feature or combination of features described herein are included within the scope of the present invention provided that the features included in any such combination are not mutually inconsistent as will be apparent from the context, this specification, and the knowledge of one of ordinary skill in the art. For purposes of summarizing the present invention, certain aspects, advantages and novel features of the present invention are described herein. Of course, it is to be understood that not necessarily all such aspects, advantages or features will be embodied in any particular embodiment of the present invention. Additional advantages and aspects of the present invention are apparent in the following detailed description and claims.

BRIEF DESCRIPTION OF THE FIGURES

FIG. 6 shows a screenshot of a TEMS function for adding new periodic maintenances:

FIG. 7 shows a screenshot of a TEMS function for modifying schedules of periodic maintenance;

FIG. 9 shows the equipment's configuration of PM scheduling;

FIG. 10 shows a screenshot of a TEMS implementation for recording maintenance data;

FIG. 14 shows a screenshot of a TEMS implementation for recording and displaying a current value of a parameter of aperiodic maintenance;

FIG. 17 shows a screenshot of a TEMS implementation created by a periodic maintenance system for managing maintenance logs;

FIG. 18 shows a screenshot of a TEMS implementation created by an aperiodic maintenance system for managing maintenance logs;

FIG. 19 shows a screenshot of a TEMS embodiment of an abnormal maintenance log;

FIG. 22 shows a screenshot of a TEMS implementation for a repairing maintenance log;

FIG. 23 shows a screenshot of a TEMS implementation of an out of control action procedure (OCAP);

FIG. 25 shows a screenshot of a TEMS implementation for notifying the user upon system logon when another user is waiting for his or her approval;

FIG. 29 shows a screenshot of the linking in periodic maintenance between FIM-EIM and TEMS;

FIG. 30 shows a completed process flow for temporary stopping a maintenance in a TEMS system;

FIG. 31 shows the relation between a PM sheet and a PM OCAP sheet;

FIG. 32 shows how to decide the period-day and tolerance of maintenance from a FIM-EIM system and a TEMS system; and FIG. 33 shows a screenshot of the linking in aperiodic maintenance between FIM-EIM and TEMS systems.

DETAILED DESCRIPTION OF THE PRESENTLY PREFERRED EMBODIMENTS

Figure 1:
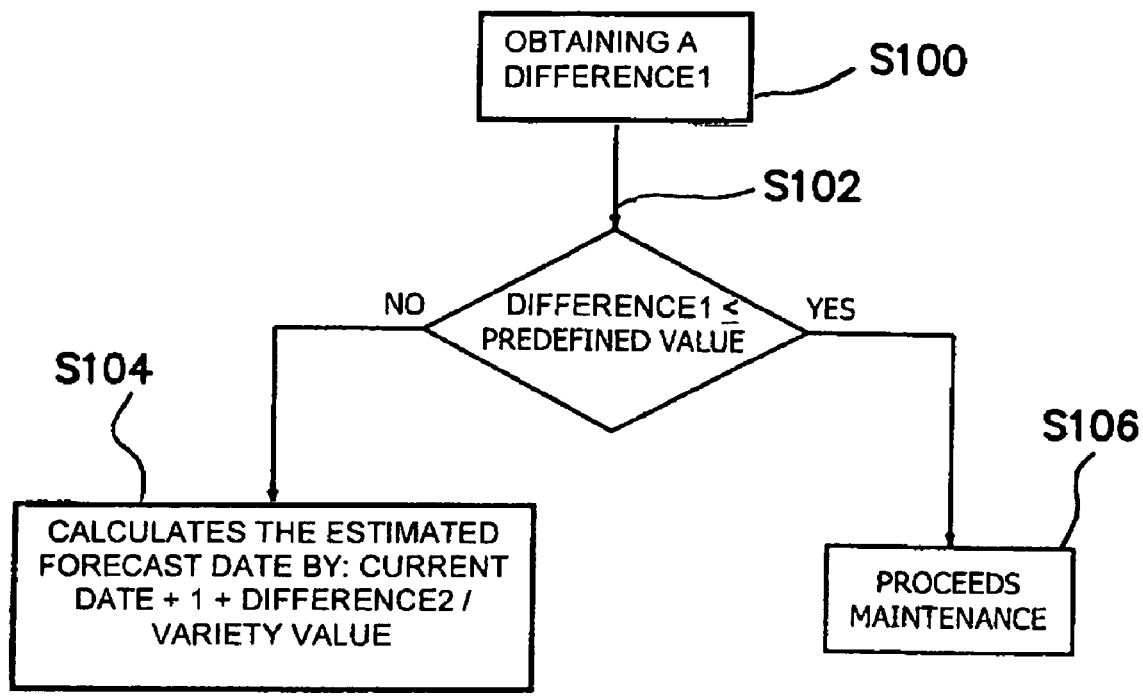
FIG. 1 is an abbreviated flow chart representing a method for estimating a maintenance date in accordance with the present invention.

Reference will now be made in detail to the presently preferred embodiments of the invention, examples of which are illustrated in the accompanying drawings. Wherever possible, the same or similar reference numbers are used in the drawings and the description to refer to the same or like parts. It should be noted that the drawings are in simplified form and are not to precise scale. In reference to the disclosure herein, for purposes of convenience and clarity only, directional terms, such as, top, bottom, left, right, up, down, over, above, below, beneath, rear, and front, are used with respect to the accompanying drawings. Such directional terms should not be construed to limit the scope of the invention in any manner.

Although the disclosure herein refers to certain illustrated embodiments, it is to be understood that these embodiments are presented by way of example and not by way of limitation. The intent of the following detailed description, although discussing exemplary embodiments, is to be construed to cover all modifications, alternatives, and equivalents of the embodiments as may fall within the spirit and scope of the invention as defined by the appended claims. It is to be understood and appreciated that the process steps and structures described herein do not cover a complete process flow for scheduling maintenance of semiconductor manufacturing equipment. The present invention may be practiced in conjunction with various scheduling and statistical techniques that are conventionally used in the art, and only so much of the commonly practiced process steps are included herein as are necessary to provide an understanding of the present invention. The present invention has applicability in the field of integrated maintenance scheduling systems in general. For illustrative purposes, however, the following description pertains to integrated maintenance scheduling systems for semiconductor manufacturing equipment.

Referring more particularly to the drawings, FIG. 1 shows a brief flow chart representing a method for estimating a maintenance date according to a first embodiment of the present invention and the below Example 1 tabulates a simple application of the method. In the embodiment of FIG. 1, a difference (S100) between a maintenance value of a parameter and a detected value of the parameter is obtained, wherein the detected value of the parameter is taken from a tool. The parameter may be, but is not limited to, number of wafers cycled or a number of RF watt-hours. The tool is any piece of equipment that may require maintenance. The difference equals the maintenance value minus the detected value. After the difference is calculated, a comparison (S102) is made to determine whether or not the difference is greater than or equal to a predefined value. Now, in Example 1, the difference (S100) on Apr. 2, 2003 is determined by subtracting 100 from 1100 to yield 1000, which is not less than or equal to zero. Similarly, the difference on Apr. 3, 2003 of 800 is not less than or equal to zero.

page 8 shown above it is 900-1100 pieces in parameter value). Therefore, if the current value is not greater than 1100 pieces in parameter value, it is a reasonable to presume a maintenance day.

When a difference (i.e., DIFFERENCE1) between the maintenance value (the "Max value of parameter") and the detected value (the "Current Value") is less than or equal to the predefined value, a maintenance procedure (S106) needs to proceed, for example, at once. For example, if the predefined value is zero, then the tool needs to be maintained once the detected value of the parameter reaches the maintenance value. If the difference is greater than the predetermined value, a forecast date calculation (S104) is performed. Generally, in the example, the Forecast Day will be the day before the Maintenance day. Thus, if a Forecast Day is determined in the example to be April $8^{th}$, then the Maintenance Day in the example will be April $9^{th}$.

The forecast date is estimated by dividing a difference (i.e., DIFFERENCE2) between the Min value and the Current Value by a variety or variation value and adding this result to the current date incremented by one. For this calculation and other calculations provided in the formulas, dates are expressed in day format (i.e., the day of the month) rather than date format (i.e., year, month, day). Also, for calculation of the maintenance date, provision is made to roll-over the maintenance date if its value exceeds the remaining number of days in the month. For example, if the current date is Apr. 29, 2003 and the forecast date calculation Example 1: Forecasting an Aperiodic Maintenance

| Date | Parameter value (a) | Current value | Parameter value$_n$ − Parameter value$_{n-1}$ | Variation (c) | Forecast PM Day (d) | Note |
|---|---|---|---|---|---|---|
| 2003/4/1 | 10000 | 0 | | NA | NA | Maintenance Day |
| 2003/4/2 | 10100 | 10100 − 10000 = 100 | 10100 − 10000 = 100 | 100/1 = 100 | 2003/4/2 + 8 + 1 = 2003/4/11 | (900 − 100)/100 = 8 |
| 2003/4/3 | 10300 | 10300 − 10000 = 300 | 10300 − 10100 = 200 | (100 + 200)/2 = 150 | 2003/4/3 + 4 + 1 = 2003/4/8 | (900 − 300)/150 = 4 |
| 2003/4/4 | 10450 | 10450 − 10000 = 450 | 10450 − 10300 = 150 | (100 + 200 + 150)/3 = 150 | 2003/4/4 + 3 + 1 = 2003/4/8 | (900 − 450)/150 = 3 |
| 2003/4/5 | 10550 | 10550 − 10000 = 550 | 10550 − 10450 = 100 | (100 + 200 + 150 + 100)/4 = 137.5 | 2003/4/5 + 2 + 1 = 2003/4/8 | (900 − 550)/137.5 = 2.5 |
| 2003/4/6 | 10750 | 10750 − 10000 = 750 | 10750 − 10550 = 200 | (100 + 200 + 150 + 100 + 200)/5 = 150 | 2003/4/6 + 1 + 1 = 2003/4/8 | (900 − 750)/150 = 1 |
| 2003/4/7 | 10900 | 10900 − 10000 = 900 | 10900 − 10750 = 150 | (100 + 200 + 150 + 100 + 200 + 150)/6 = 150 | 2003/4/7 + 0 + 1 = 2003/4/8 | (900 − 900)/150 = 0 |
| 2003/4/8 | 11000 | 11000 − 10000 = 1000 | 11000 − 10900 = 100 | (100 + 200 + 150 + 100 + 200 + 150 + 100)/7 = 150 | 2003/4/8 | In this case DIFFERENCE1 ≦ PREDEFINED VALUE in S102 (Max value − Current Value = 0), and the forecast day is today. |
| 2003/4/9 | 11100 | | | | | Actual Maintenance Day |

Current value Type: accumulative-type
Max value of parameter: 1100
Min value of parameter: 900
Maintenance item: 1000 piece of wafers cycled
Formula 1-1: Variation = [Σ(Parameter value$_{(n)}$ − Parameter Value$_{(n-1)}$)]/(Date$_{(n)}$ − Date$_{(1)}$); n is an integer.
Formula 1-2: Forecast Day = Date + 1 + [(Min value of parameter − Current Value)/Variation]* (note: the * value is rounded down)
Formula 1-3: Current Value$_{(n)}$ = Parameter Value$_{(n)}$ − Parameter Value$_{(last\ PM)}$ The Current value can be expressed as the Current Parameter value minus the Last maintenance parameter value. Based on the formulas, the system predicts that the maintenance day should be Apr. 8, 2003, but in real cases the maintenance day has a reasonable tolerance (in the table of (S104) yields a day that is five days beyond that date, the maintenance date would be May 4, 2003 rather than Apr. 34, 2003.

Since in the illustrated embodiment DIFFERENCE2 is being divided by the variation value, the variation value represents change of the parameter per time unit. The variation value can be set by at least one of two ways. One way involves calculating the variation value from data corresponding to detected values of the parameter which were obtained from the tool over a period of time prior to the estimating of a maintenance date.

As presently preferred the data is stored data, and the period of time is several days. The stored data can be obtained from the parameters obtained from a tool for several days as mentioned and/or from parameters obtained in previous maintenance date estimates. Another way involves calculating the variation value from data immediately inputted by users. Another way involves calculating the variation value from stored data in conjunction with data immediately inputted by users. For all of the aforementioned ways of determining the variation value, a statistical methods can be employed. The maintenance date can be stored to a maintenance schedule if for example the maintenance does not proceed at once.

FIG. 1 also applies to a method for estimating a maintenance date by tracking multiple parameters according to a second embodiment of the present invention. When multiple parameters are used, each parameter has its own associated detected value, maintenance value, predefined value, and variation value. The detected values are the values of the parameters taken from the tool. The maintenance values are typically the values of the parameters that the detected values are not allowed to exceed. Differences (S100) between maintenance values of parameters and detected values of the parameters are calculated for all parameters being tracked. The predefined values determine cut-off points for the differences. Comparisons (S102) are then made to determine whether or not a predetermined number of the differences is less than or equal to its corresponding predefined value. In the illustrated embodiment, the predetermined number is one so that comparisons (S102) are made to determine whether each difference (DIFFERENCE1) is less than or equal to its predefined value. If any of these differences are less than or equal to their corresponding predefined values, then a maintenance procedure (S106) is performed as soon as possible. If all of the differences are greater than their respective predefined values, then a maintenance date calculation (S104) is performed to estimate the maintenance date according to the differences (DIFFERENCE2s) and variation values for each parameter. The differences are divided by the variation values, with each of the variation values representing change of the corresponding parameter per time unit.

The variation values may be determined as set forth above but applied in the context of multiple parameters. As presently embodied, the variation values are determined by a statistical method that considers previously measured parameters, which may come from stored data and/or current data entry. Each variation value can be calculated from data corresponding to detected values of parameters which were obtained from the tool over a period of time prior to the calculation of an estimated maintenance date at S104. As presently preferred the data is stored data, and the period of time is several days. The stored data can be obtained from the parameters obtained from a tool for several days as mentioned and/or from parameters obtained in previous maintenance date calculations. For current data entry, data immediately inputted by users can be used to calculate the variation values. The measured data may include a combination of current detected values entered by users and stored data from previous measurements. The variation values can also be calculated from stored data in combination with data immediately inputted by users. Once the maintenance date is calculated, it is preferably stored to a maintenance schedule.

Figure 26:
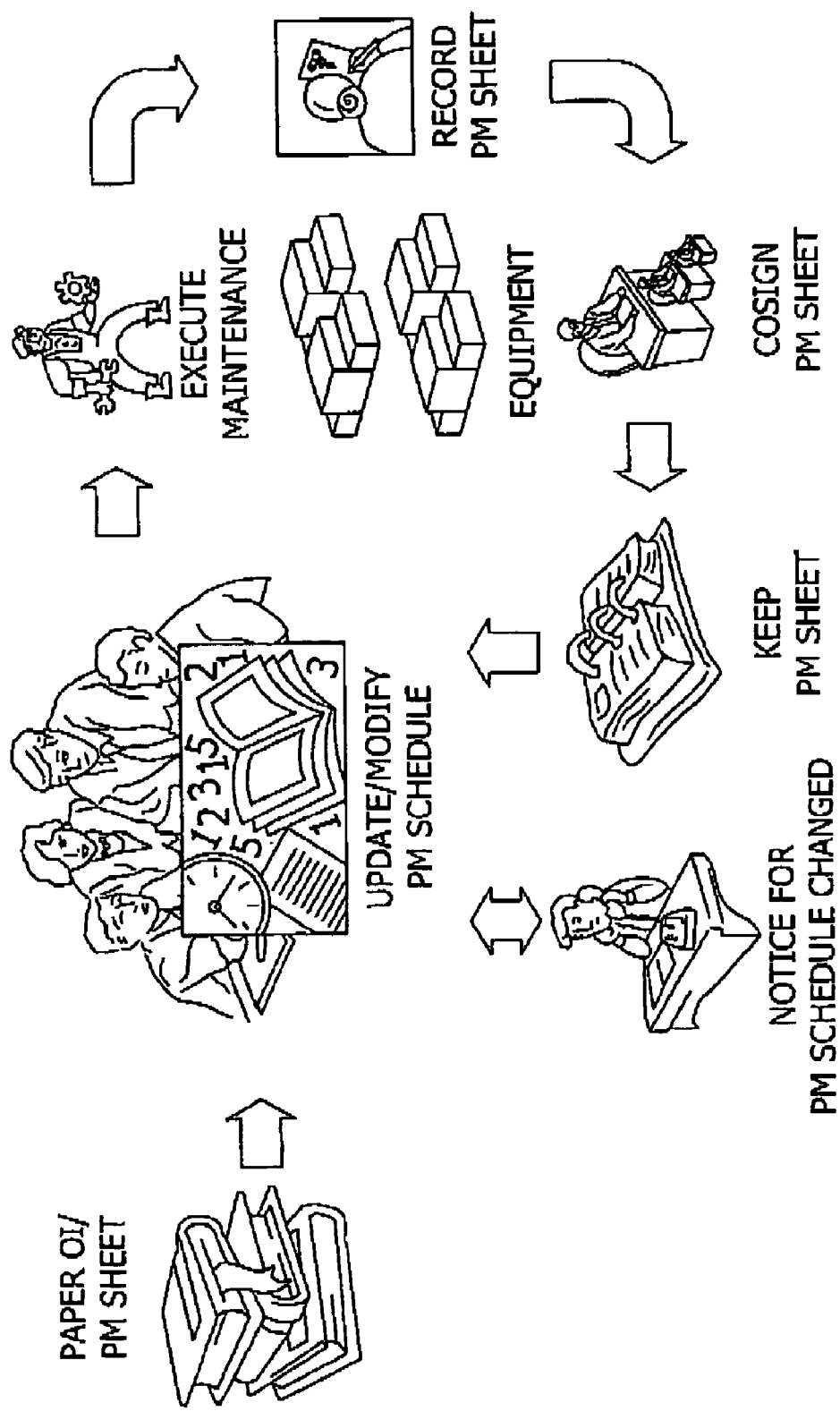
FIG. 26 is a process flow for a conventional manual management of maintenance implementation.
Figure 27:
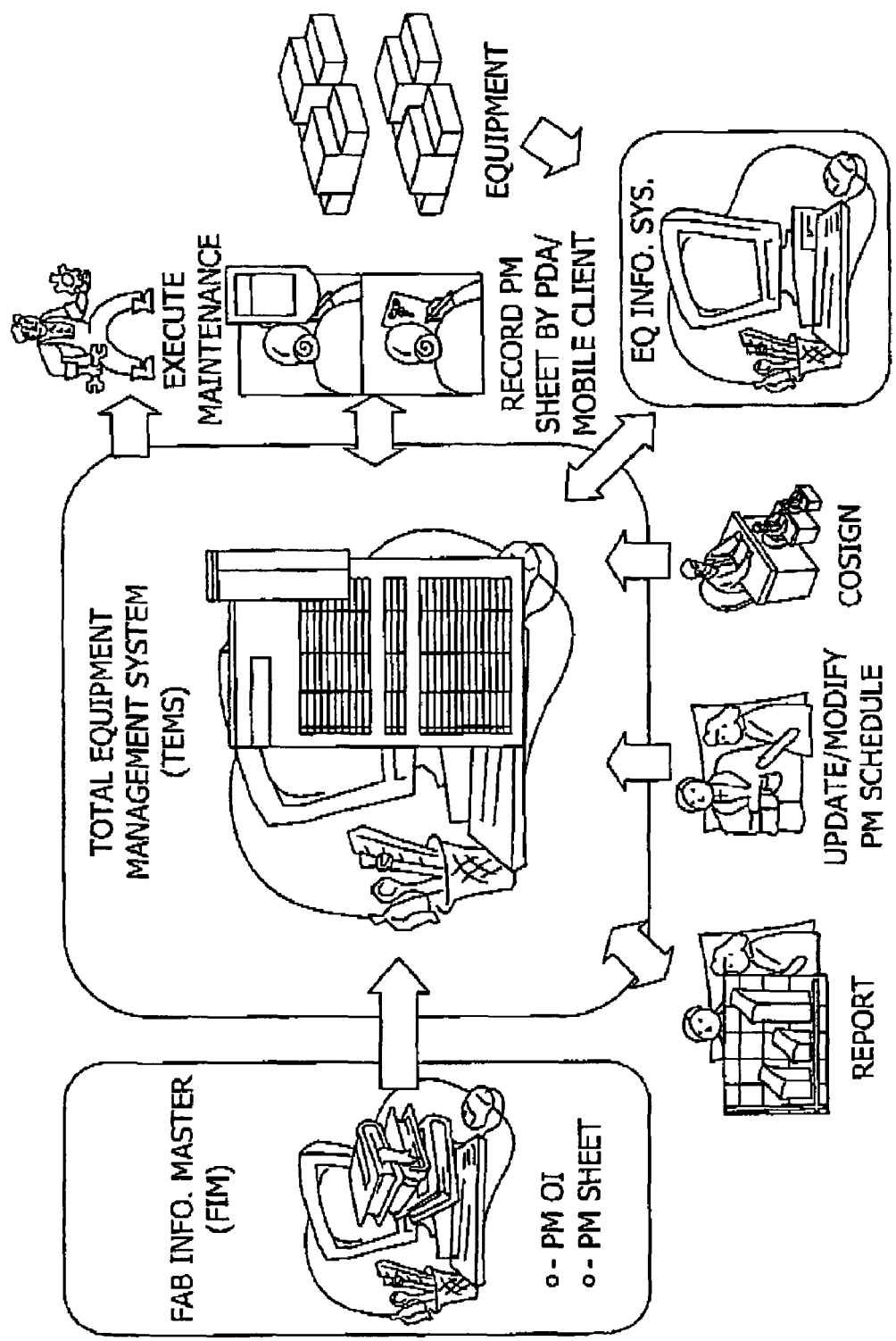
FIG. 27 is a process flow for an automated management of maintenance via TEMS.

There are multiple advantages of implementing the process flow of the present inventive Total Equipment Management System TEMS (as shown in FIG. 27) in lieu of a manual process of maintenance (as shown in FIG. 26). The first advantage is that integrating TEMS with other computerized information systems can ensure data consistency and achieve a high quality of maintenance. Integrating with the automated systems of the equipment, the system can obtain the parameters directly from the equipment itself. This saves the time of the engineer, who would otherwise need to go to the equipment and record the parameter of the equipment, and eliminates errors in manually transferring data.

Integrating with a standard operation procedure (SOP) system, the system can make sure that the data on PM sheets and the SOP data are consistent, thereby attaining maintenance quality. Dynamically forecasting and managing the plan of maintenance can improve the efficiency of management and ensure that maintenance is carried out. Combining the professional methodology with the automatic collection of the parameters of the equipment, TEMS can provides a solution to dynamically forecasting and managing the plans of maintenance and can improve efficiency of management.

Implementing TEMS can improves production efficiency of equipment. Integrating with periodic maintenance, aperiodic maintenance, abnormal maintenance, equipment repair, daily maintenance, and the recorded parameters of equipment, the maintenance management system can monitor and manage the status of maintenance and thereby decreases the breakdown of equipment and improve the productive efficiency of the equipment by expanding the maximization of product.

Computerized management of maintenance and data storage decreases paper usage and save time for the employee. TEMS supports monitoring report and alerting report features that integrate and analyze the maintenance data stored in the management system and thereby improves the application value of maintenance data.

The total equipment managing systems of the present invention can monitor and control the condition of all equipment and keep the equipment running optimally at all times. Driven by fierce competition, semiconductor fabrication facilities are economically compelled to ensure efficient scheduling, utilization, and maintenance of process tools. With TEMS in place, it is possible to audit the maintenance actions and to quickly query all of maintenance history for all tools in a facility. It is also possible to quickly copy the managing system to a new facility wherein the managing data of the older facility can be utilized by the new facility. Having the data from the older facility can result in a faster and more efficient startup of a new factory.

Figure 3:
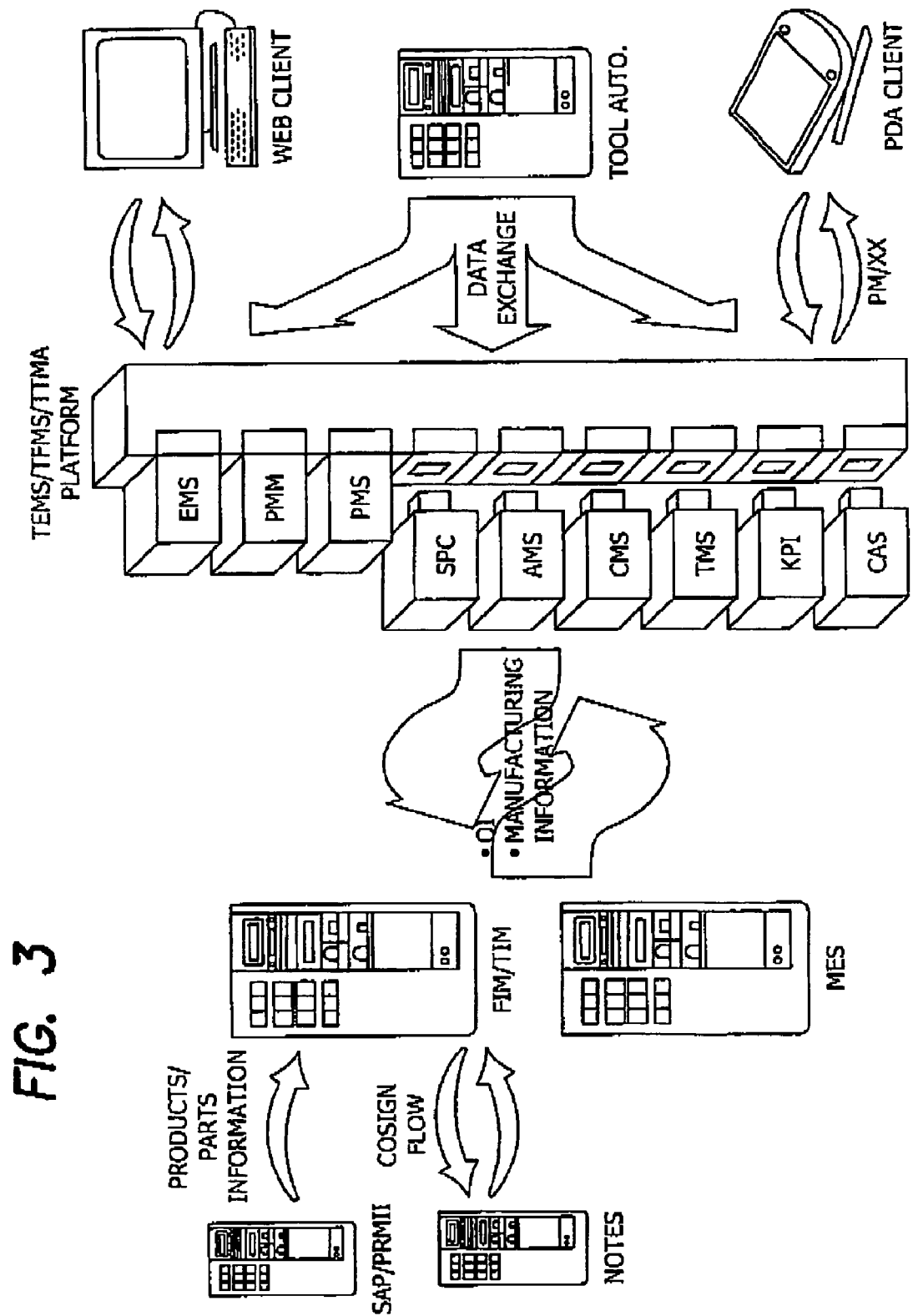
FIG. 3 is a modular diagram showing the structure of a total equipment management system (TEMS) of the present invention.
Figure 4:
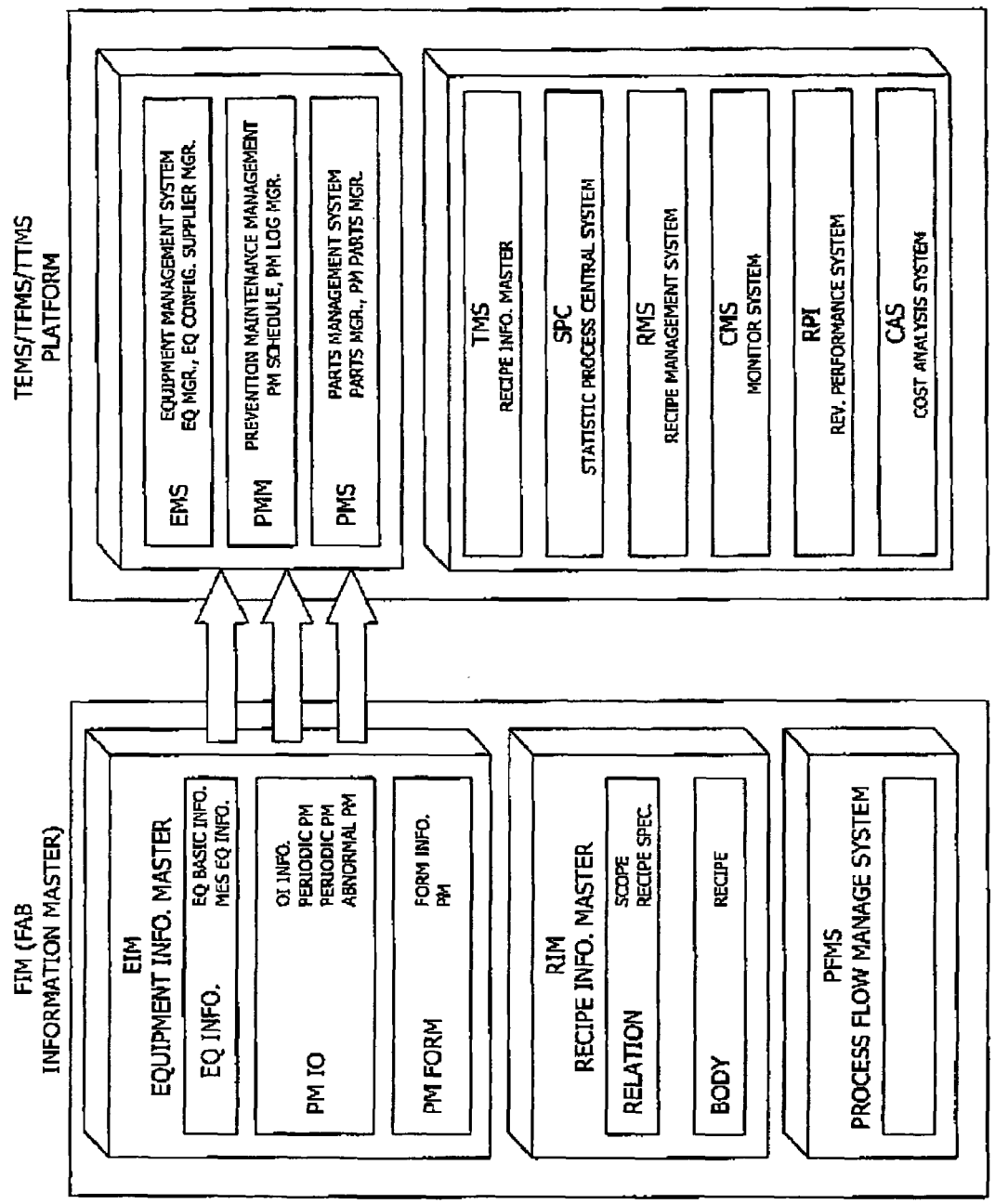
FIG. 4 is a modular diagram showing linking between a fabrication information master (FIM) system and a TEMS.

As shown in FIG. 3, subsystems of TEMS include an Equipment Management System (EMS), Preventive Maintenance Management (PMM), a Parts Management System (PMS), a Statistic Process Control (SPC) System, an Alarm Monitor System (AMS), a Camera Monitor System (CMS), a Troubleshooting Management System (TMS), a Key Performance Indicator (KPI) System, and a Cost Analysis System (CAS). As shown in FIG. 4, TEMS can also quickly get the operating instruction (OI) information and preventative maintenance (PM) item information from other OI systems such as a Fabrication Information Master (FIM) to ensure the validity of maintenance. The stability and the reliability of the equipment is ensured through preventative maintenance that is efficiently executed and managed, thus reducing the occurrences of unexpected faults and thereby ensuring the quality of the product.

The Equipment Management System (EMS) functions comprise managing and setting basic data of equipment, such as the name of the equipment, the location of equipment, etc. This subsystem also configures data related to the equipment, such as setting the tolerances of maintenance for specific equipment or stopping/starting the scheduled plan of maintenance of equipment.

Figure 5:
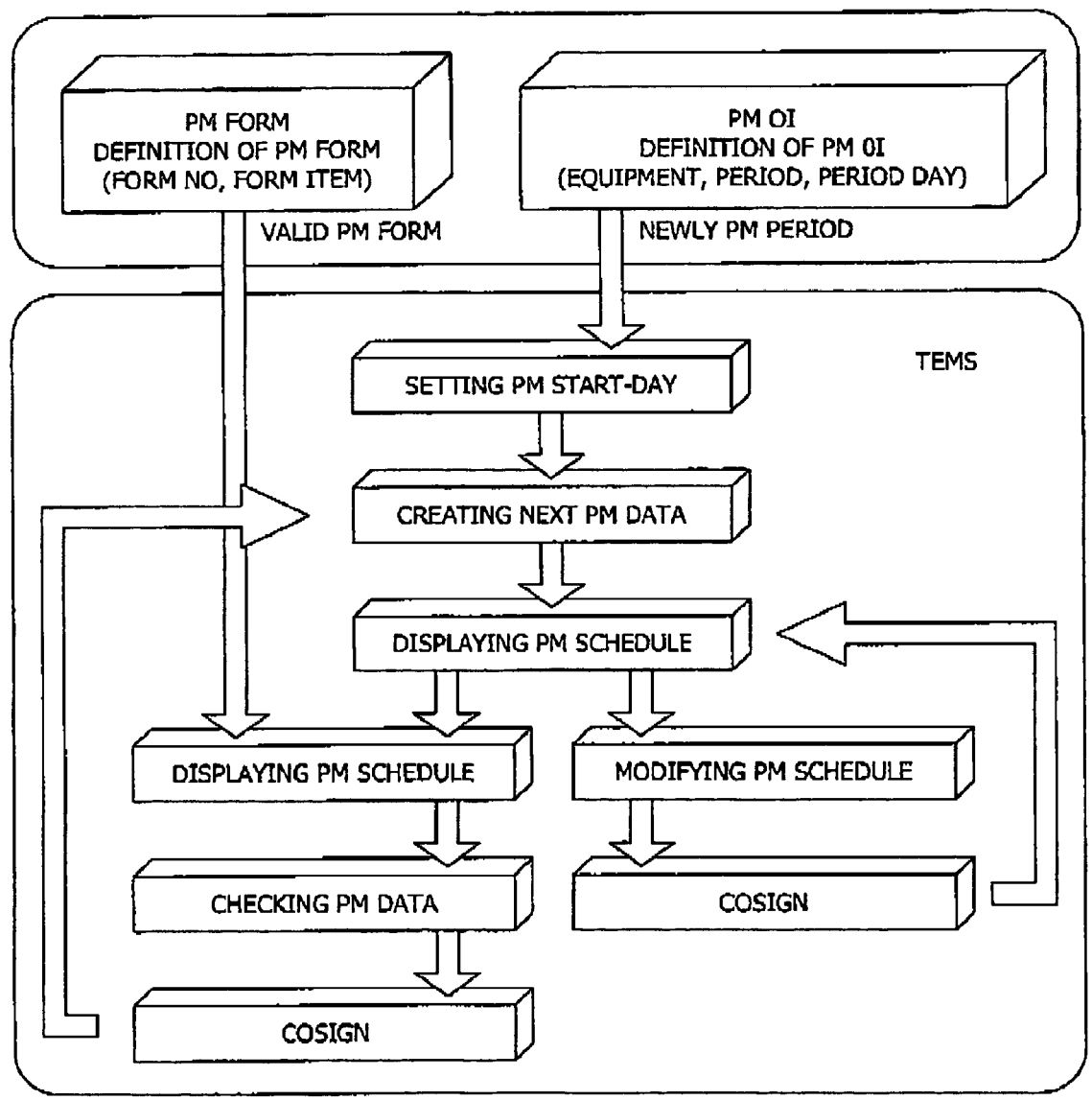
FIG. 5 shows a processing flow for automatically scheduling periodic maintenance via TEMS.

The Prevention Maintenance Management (PMM) system performs many functions. It manages the scheduling plans of maintenance by modifying and displaying the scheduling plan of maintenance of equipment. It also records and displays the logs of periodic maintenance (as shown in FIG. 17), aperiodic maintenance (as shown in FIG. 18), abnormal maintenance, repaired maintenance, daily maintenance, and out of control action procedures (OCAP). PMM is also capable of recording or querying the parameters of equipment for aperiodic maintenance as well as querying reports of maintenance of equipment by week or month. The PM sheets can be uploaded to or downloaded from for example a PDA. Operation Instruction (OI) of equipment can also be queried as at the Fab Information Master-Equipment Information Master (FIM-EIM) system. Many tools require periodic maintenance. Period maintenance has a fixed period (e.g., weekly, monthly, etc.) of maintenance and a tolerance within which the maintenance should be performed. FIG. 5 shows the processing flow used to automatically schedule periodic maintenance. With the period and the tolerance of maintenance, the TEMS system can forecast the next maintenance date that is required for a given piece of equipment. In an illustrated embodiment, the formula for forecasting periodic maintenance is a follows:

Forecasting PM day=Last PM day+Tolerance+User's criteria   Formula 2 wherein the tolerance is as defined in the FIM-EIM system and the TEMS system. The tolerance in the FIM-EIM system is a standard value for all of the company, and the tolerance in the TEMS system is more stern than the tolerance in the FIM-EIM system. The user's criteria can include items specific to a given user. For example, if the forecasting day falls on a weekend, then the system will arrange the maintenance day on either Friday or Monday depending on the value of "Holiday Setting" of the EQ. configuration function.

FIG. 6 shows a screenshot of the TEMS function for adding new periodic maintenances. If a new type of the equipment is added to the FIM-EIM (Fab Information Master-Equipment Information Master) system that requires maintenance, the system will send an electronic mail message to notify the manager to add the periodic maintenance to the TEMS system and to set the start date of maintenance. If a type of equipment is removed from the FIM-EIM (Fab Information Master-Equipment Information Master) system that requires maintenance, the TEMS system will automatically remove the period of maintenance. FIG. 29 shows the Quarterly PM2 of ADT-13 removed from the FIM-EIM system, and the TEMS system automatically stops the forecasting schedule in the PM Scheduling Plan.

Figure 8:
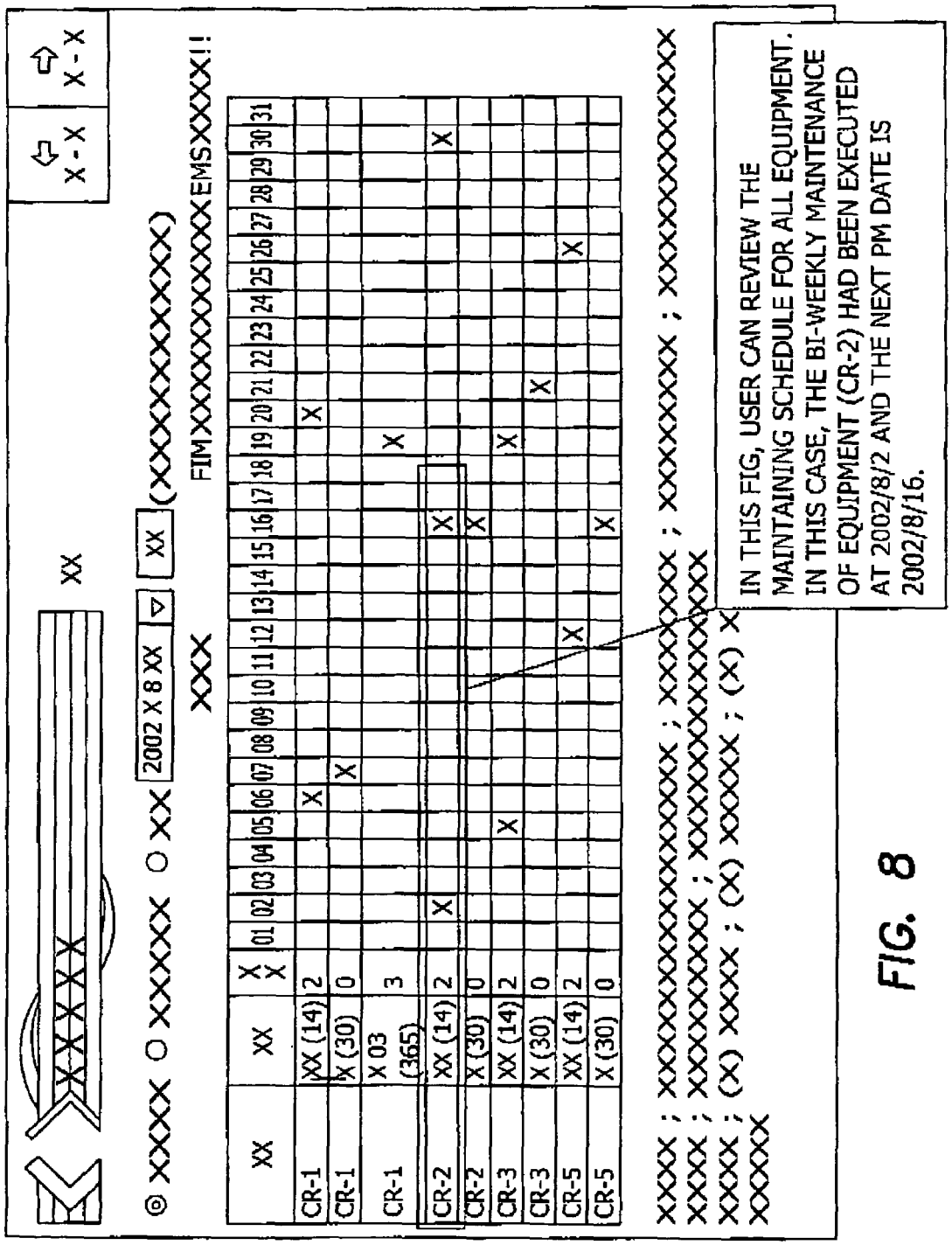
FIG. 8 shows a screenshot of a TEMS implementation for scheduling periodic maintenance.
Figure 9:
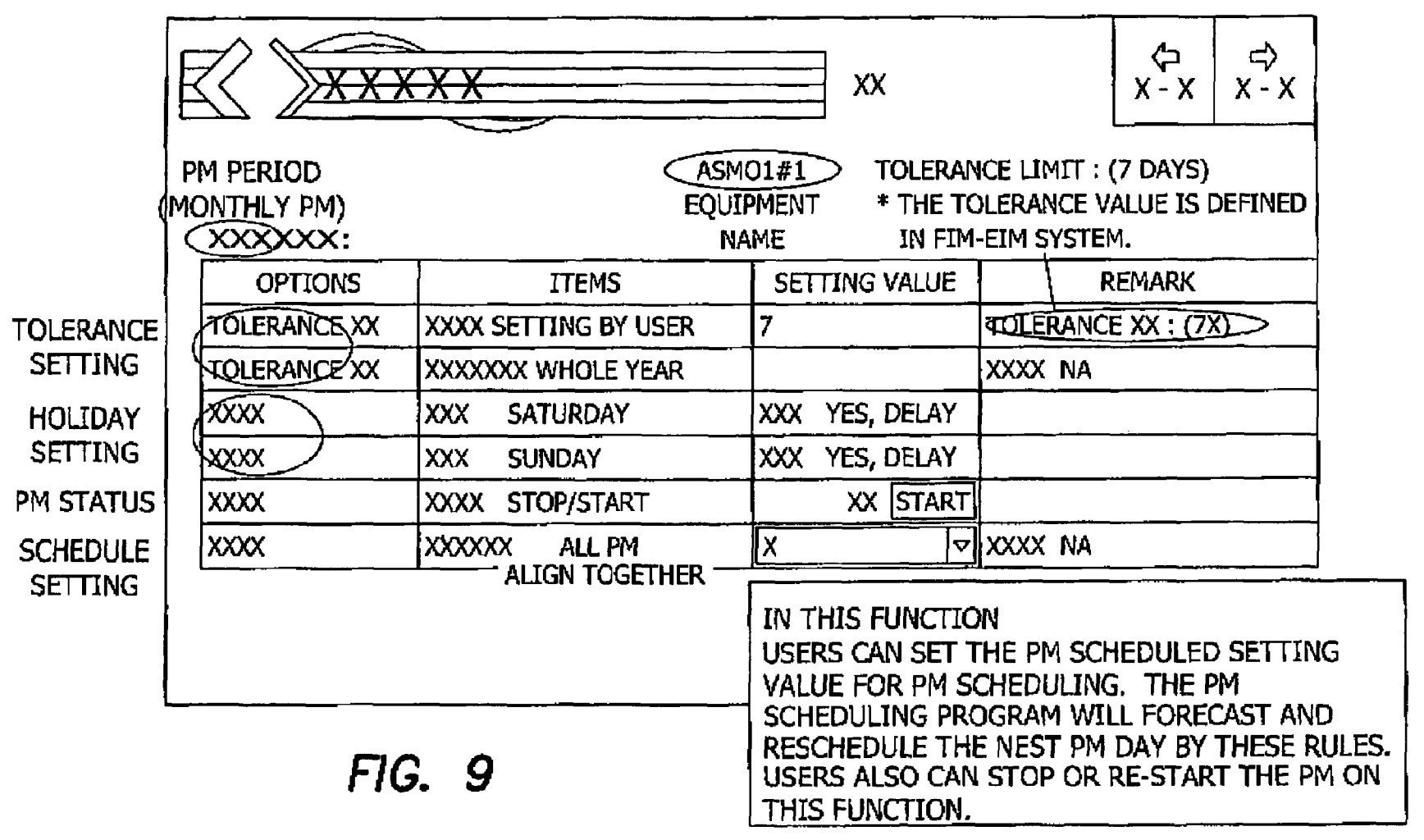
Figure 24:
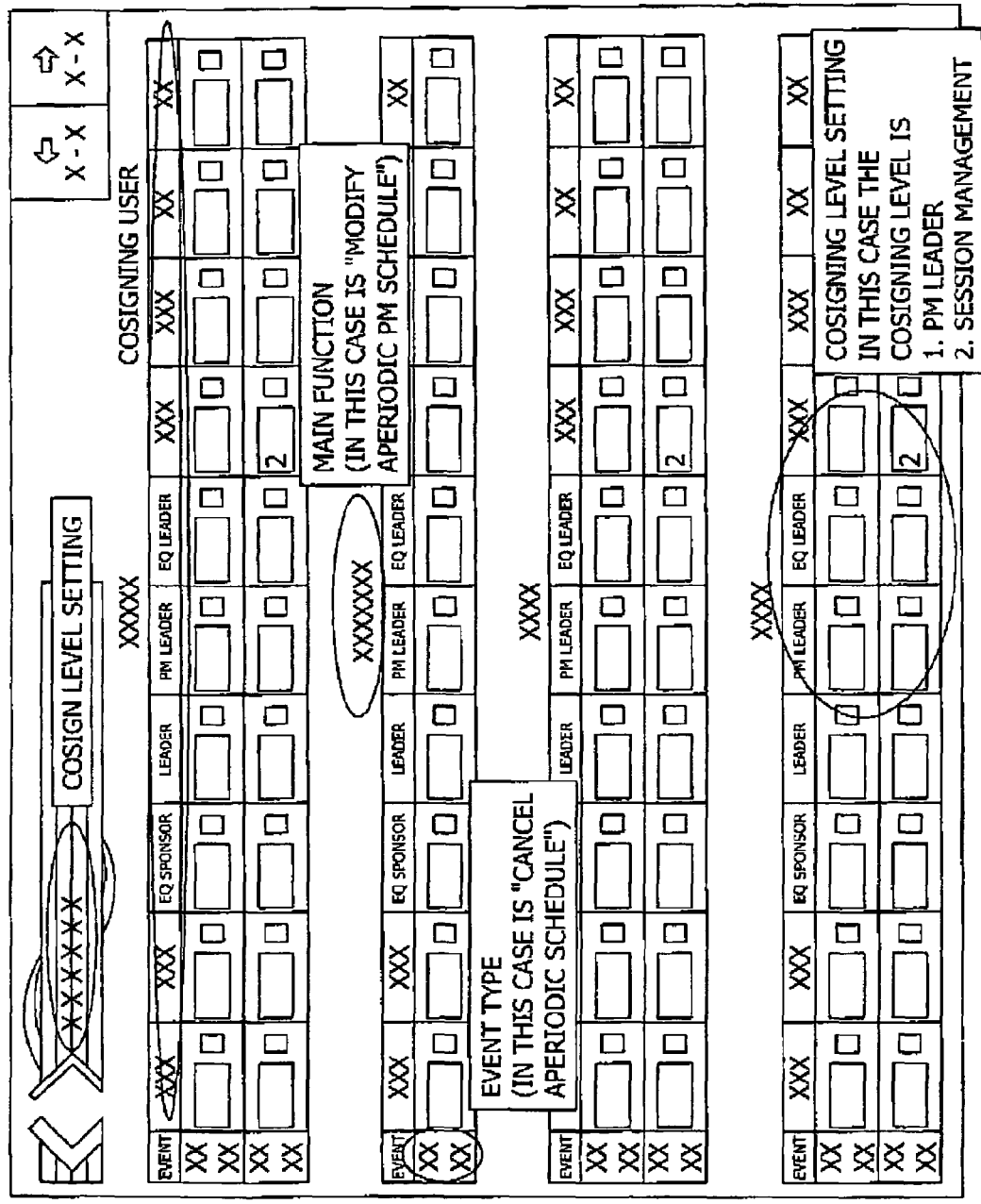
FIG. 24 shows a screenshot of a TEMS implementation for approving the setting of layers of classes of cosigners.
Figure 30:
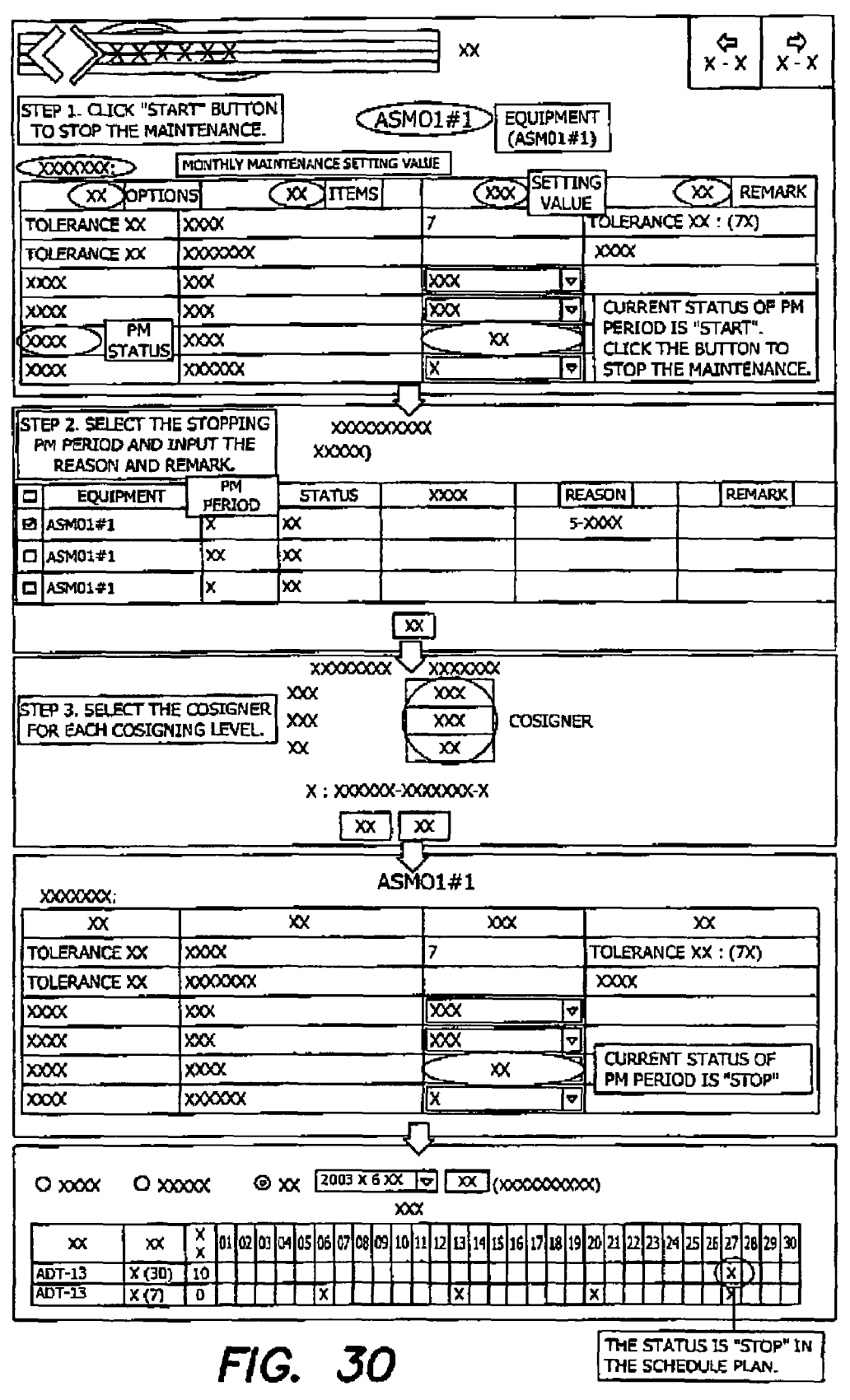

FIG. 7 shows a TEMS screenshot for modifying schedules of periodic maintenance, while FIG. 8 shows a display of the schedules of periodic maintenance. When the manager modifies or cancels an instance of scheduled maintenance because of for example production needs, the TEMS system's "modifying schedule function" will automatically check the modified maintenance date to see whether or not it falls within the allowed tolerance and decide the cosign level as discussed in connection with FIG. 24. FIG. 24 shows a "Cosign Level Setting" function, which serves to define all cosign levels (e.g., cosign to session manager, session leader, etc . . . ) for each function. If the cosign event has happened, the system will shows the cosign level in the assigning-cosigner screen for each function. (The assigning-cosigner screen can be seen in FIG. 30, step 3.) FIG. 9 shows the equipment's configuration of PM scheduling, where users can configure these values; the system will forecast and re-schedule the next PM day by these setting values. A user can stop the PM scheduling temporarily and reboot the PM. (An example of temporarily Stopping PM is elucidated in FIG. 30). When the equipment takes a long time to repair or needs to be shut down for any other issue, the manager can also stop the scheduled maintenance and restart the scheduled maintenance when the issue is resolved.

Figure 10:
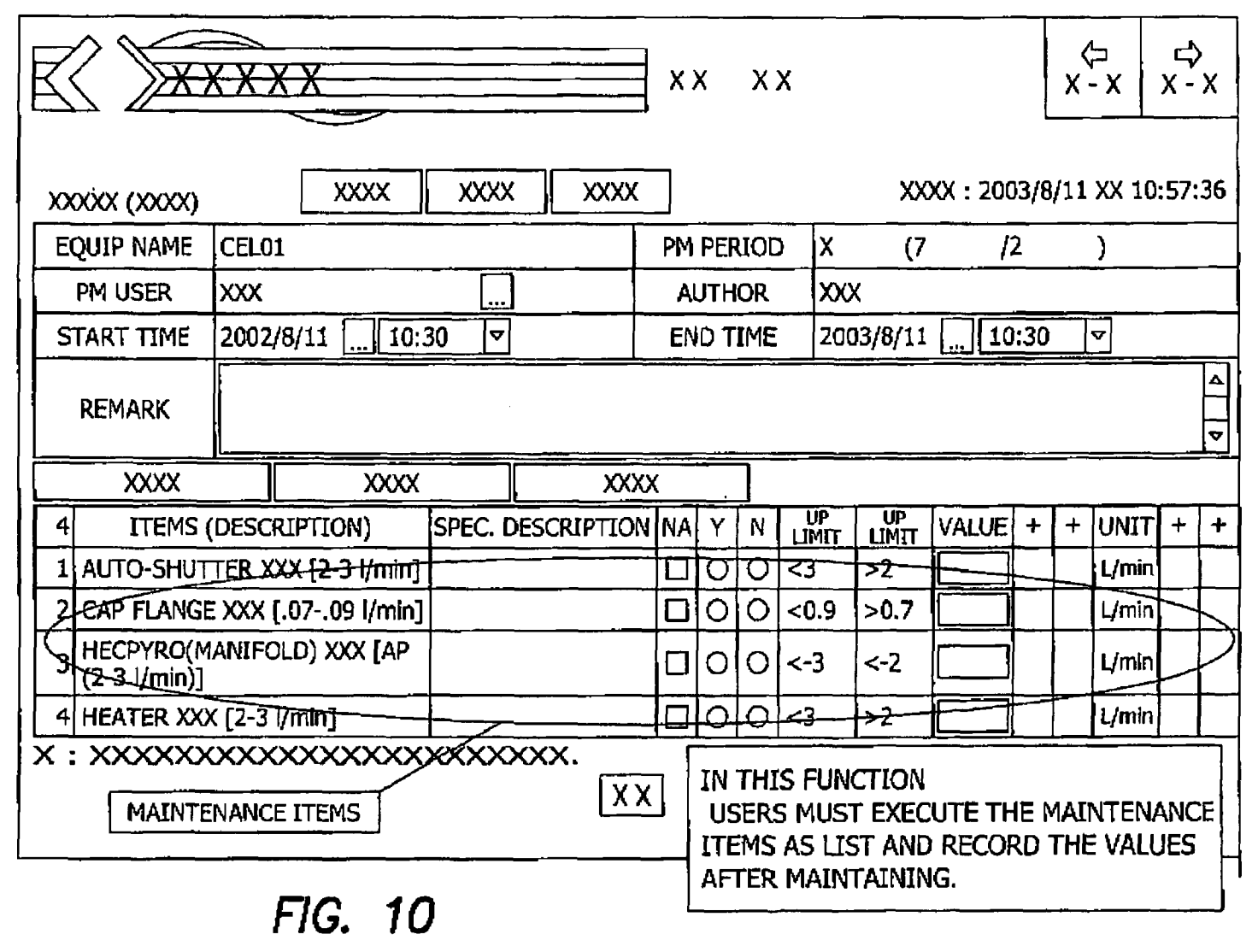

FIG. 10 shows a screenshot of TEMS for recording maintenance data. TEMS will automatically link to the FIM-EIM system to get the items of maintenance for an engineer to maintain and record. After the engineer records the maintenance data, TEMS uses the data to determine whether or not the tool performance is acceptable. If the result of the maintenance yields unacceptable tool performance, TEMS will create a PM out of control action procedure (OCAP) log for the engineer to notify the user and the manager to cosign as discussed in connection with FIG. 24. FIG. 31 shows the executed PM Sheet with a failure item, and the system creates a PM OCAP Sheet for this PM Sheet.

Figure 11:
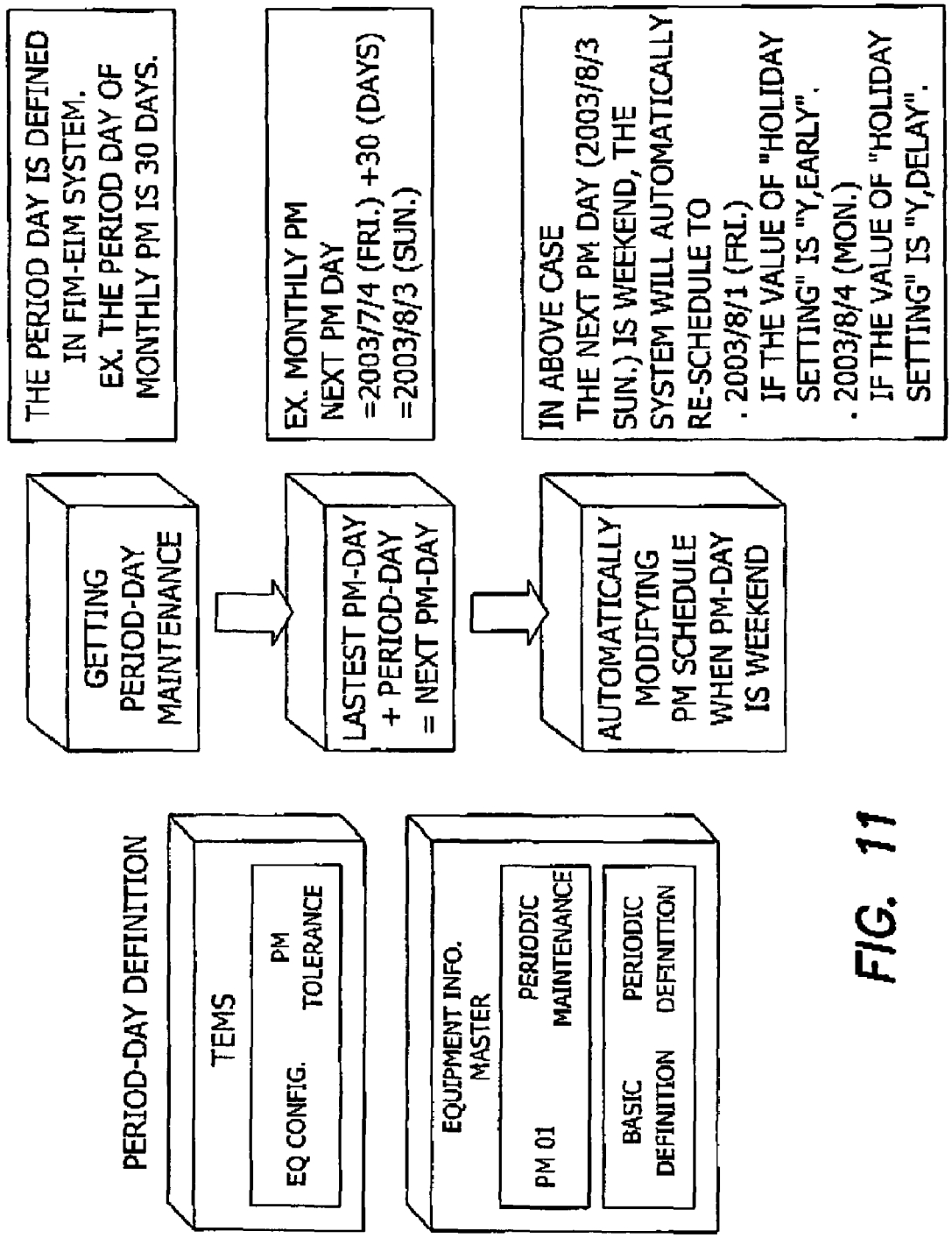
FIG. 11 is a process flow of a TEMS implementation showing a forecasting rule for periodic maintenance.
Figure 32:
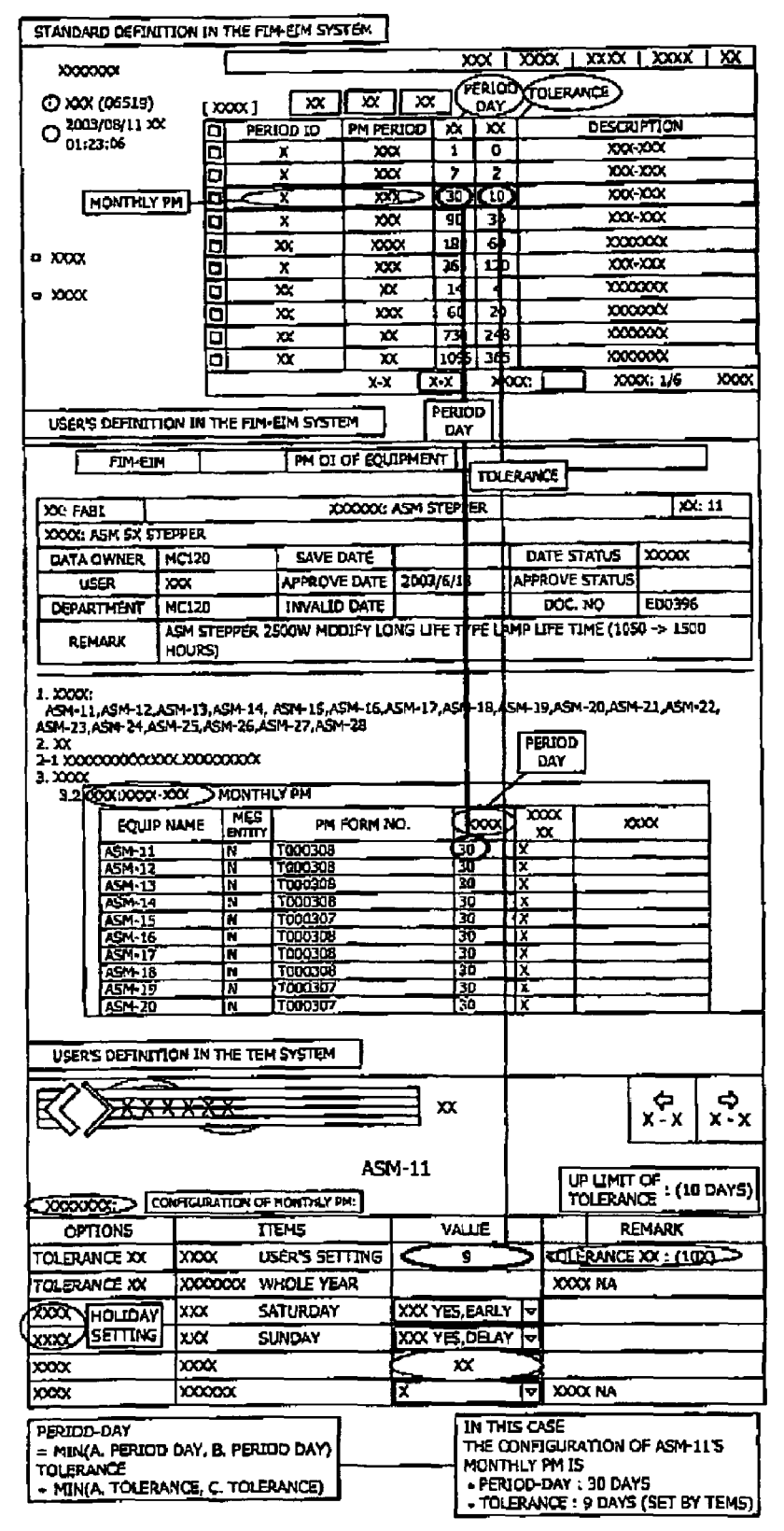

TEMS can forecast the next maintenance date according to the rules assigned to the system. FIG. 32 shows the system how to decide the value of Period-Day and Tolerance from EIM-EIM and TEMS. FIG. 11 is a process flow of TEMS showing one such forecasting rule for periodic maintenance. TEMS also forecasts the next maintenance date depending upon the period and last maintenance date. The data for the period can come from a user setting in the TEMS-Preventive Maintenance Management (PMM) system, a user setting in th& FIM-EIM system, or a default setting in the FIM-EIM system. (See as FIG. 32.)

Figure 12:
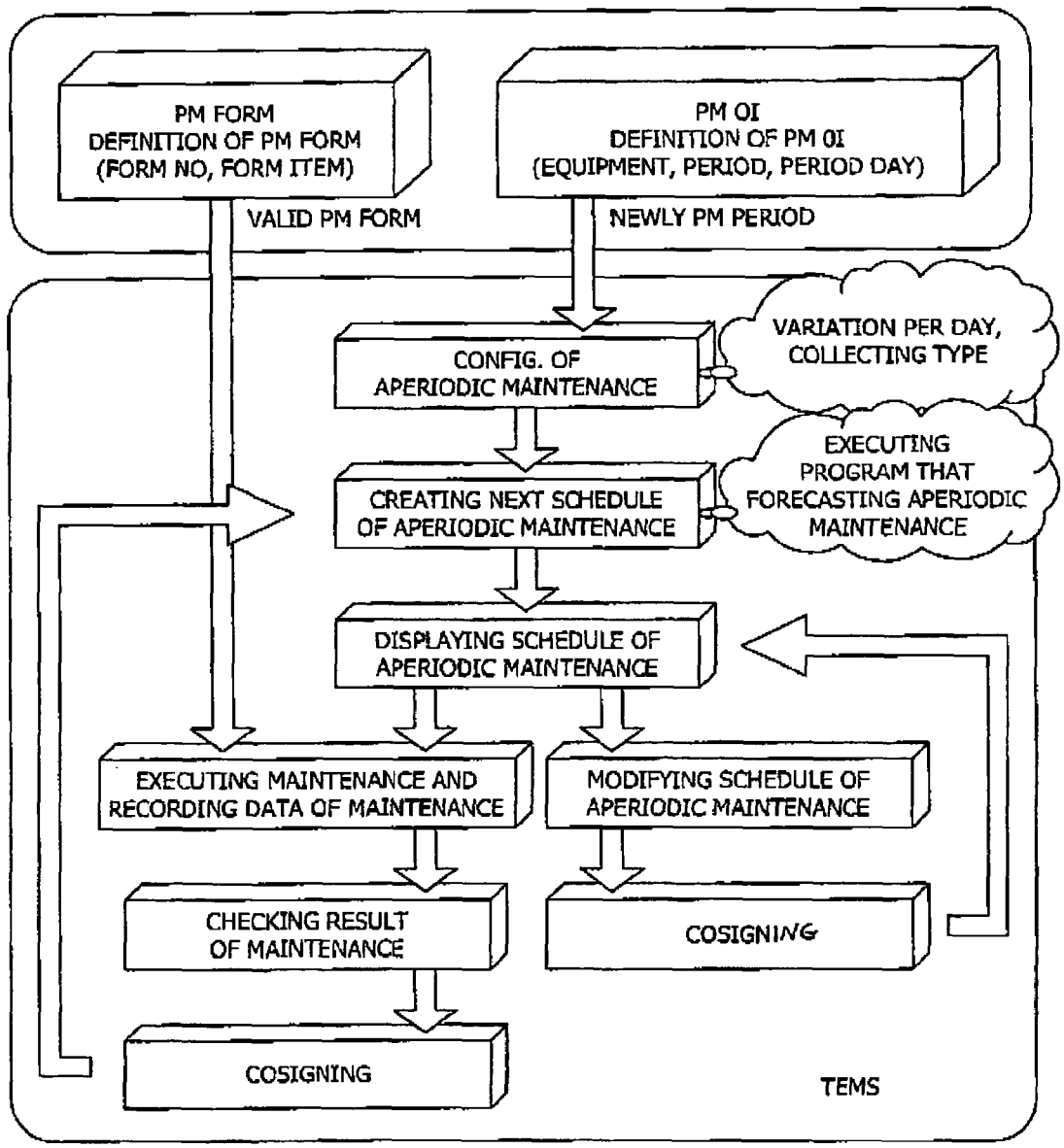
FIG. 12 shows a processing flow for automatically forecasting schedules for aperiodic maintenance via TEMS.
Figure 33:
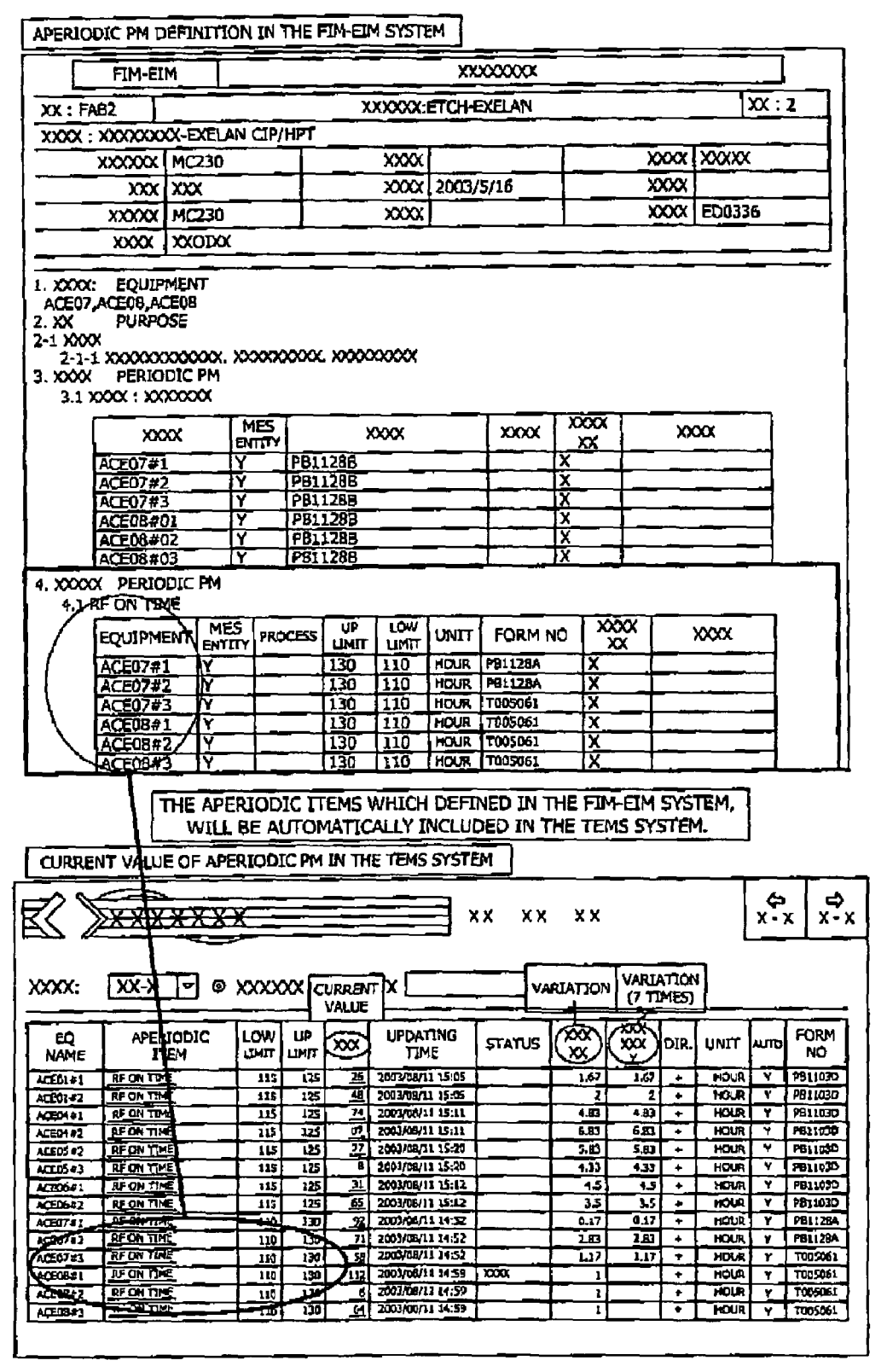

For some tools, however, maintenance cannot be scheduled in a periodic fashion due for example to variations in tool use. Thus, the executing of aperiodic maintenance can depend upon whether or not a monitored parameter of the equipment exceeds the specification of its operating instruction (OI) as shown in the flow chart of FIG. 12. FIG. 33 shows the relation of the aperiodic Items between the FIM-EIM system and the TEMS system. The monitored parameters (as FIG. 33's current value) can be updated by a user or a program running in a computer. This OI is stored in the FIM-EIM system.

Figure 13:
FIG. 13 shows a screenshot of a TEMS implementation for setting a configuration of aperiodic maintenance.

FIG. 13 shows a TEMS setting for the configuration of aperiodic maintenance. The processes of aperiodic maintenance include collecting the parameter of the equipment, forecasting the date for aperiodic maintenance, and recording the maintenance data. Similar to a periodic maintenance implementation, TEMS thus can manage families of tools that are added to or removed from the aperiodic equipment maintenance list in the FIM-EIM system. The manager can set basic information, e.g., variation per day, direction of variation, collecting type of parameter of the equipment, about the aperiodic maintenance.

FIG. 14 shows a TEMS implementation for recording and displaying current values of parameters of aperiodic maintenance. If the collecting type is set to "auto", then TEMS, which is linked to the equipment, can automatically collect and save the parameters of the equipment via a program that runs daily. For the other collecting types, a user can manually record or use a personal digital assistant (PDA) to record the current value of parameters of the equipment, compute the aperiodic maintenance, and update the TEMS-PMM database. The values of the parameters entered can have three types of current values: 1) Accumulative-type, wherein the value of the parameter of the equipment cannot be reset to zero; for this case all history data of equipment parameters is collected in the data-base, and the current value is computes and saved in the data-base. (See Example 1.) Current value=Parameter value$_{(last\ PM)}$–Parameter value$_{(current)}$. 2) Converting-Type, wherein the current values of the parameters of the equipment must be converted by a predetermined calculation; in this type, the row data collecting from equipment must compute with an engineering value. Ex. An example can be the conversion of temperature from ° F. to □. Current value=value of equipment's parameter * engineering value. 3) Resetting-Type, wherein the current value of the parameters of the equipment must be reset to zero. In this type, the parameters of equipment must be reset to zero after executed maintenance. Current value=value of equipment's parameter. If the collecting type is "auto," then the program that automatically collects the parameters of the equipment will convert the actual value to the TEMS depending on the above current value type.

Figure 15:
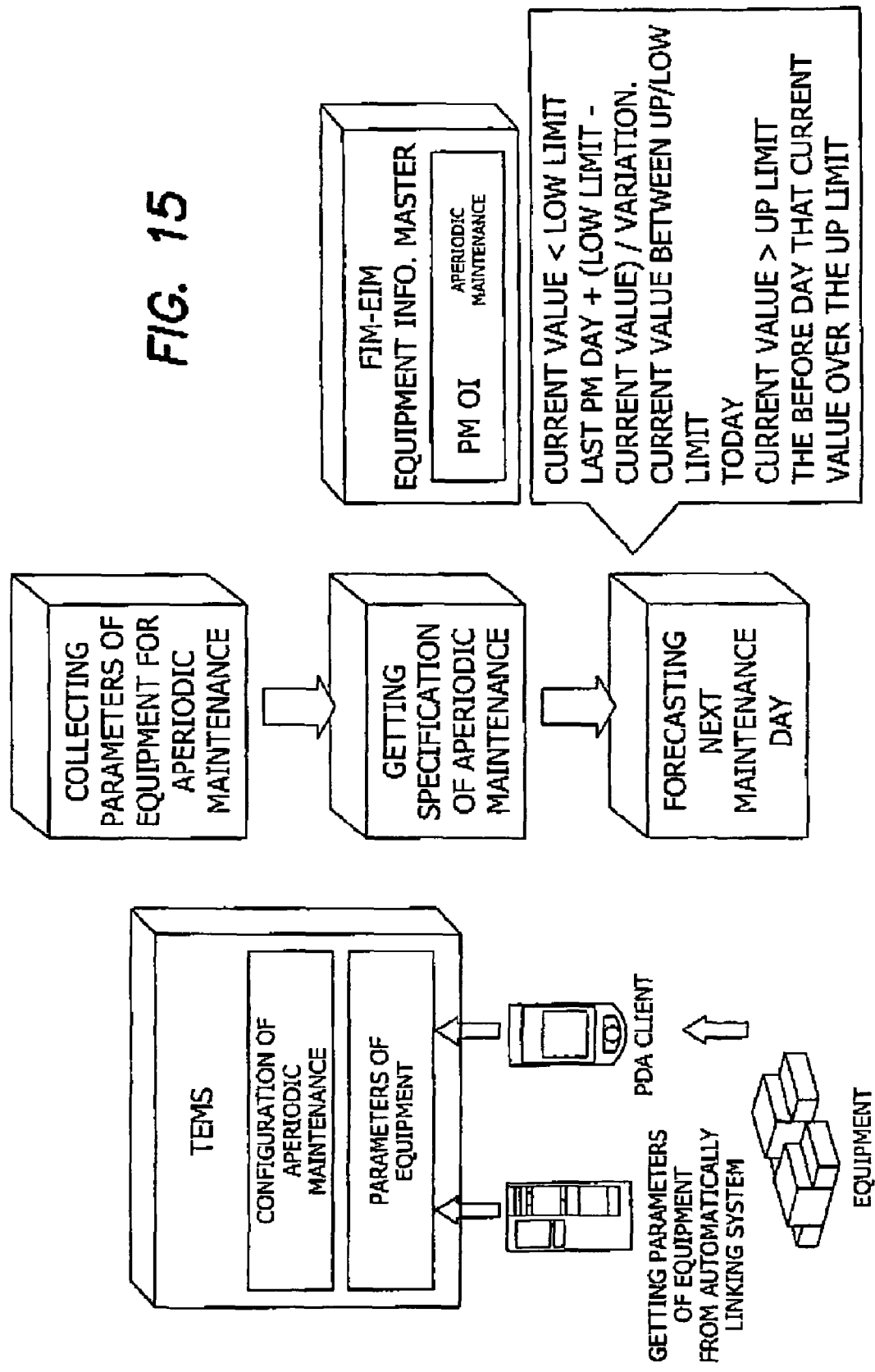
FIG. 15 shows a process flow of a TEMS implementation for a forecasting rule of aperiodic maintenance.

FIG. 15 shows a process flow of a TEMS implementation for a forecasting rule of aperiodic maintenance. The forecast of each aperiodic maintenance date is updated by a daily running program that uses the current value of the parameter of the equipment and computes the maintenance date based upon the upper and lower limit specifications defined for that parameter on the FIM-EIM system. When the data trend for the parameters changes direction, e.g. the parameters are increasing daily, but the parameter decreases the following day, maintenance has been executed and the current value of the parameter of the equipment has been reset.

Figure 16:
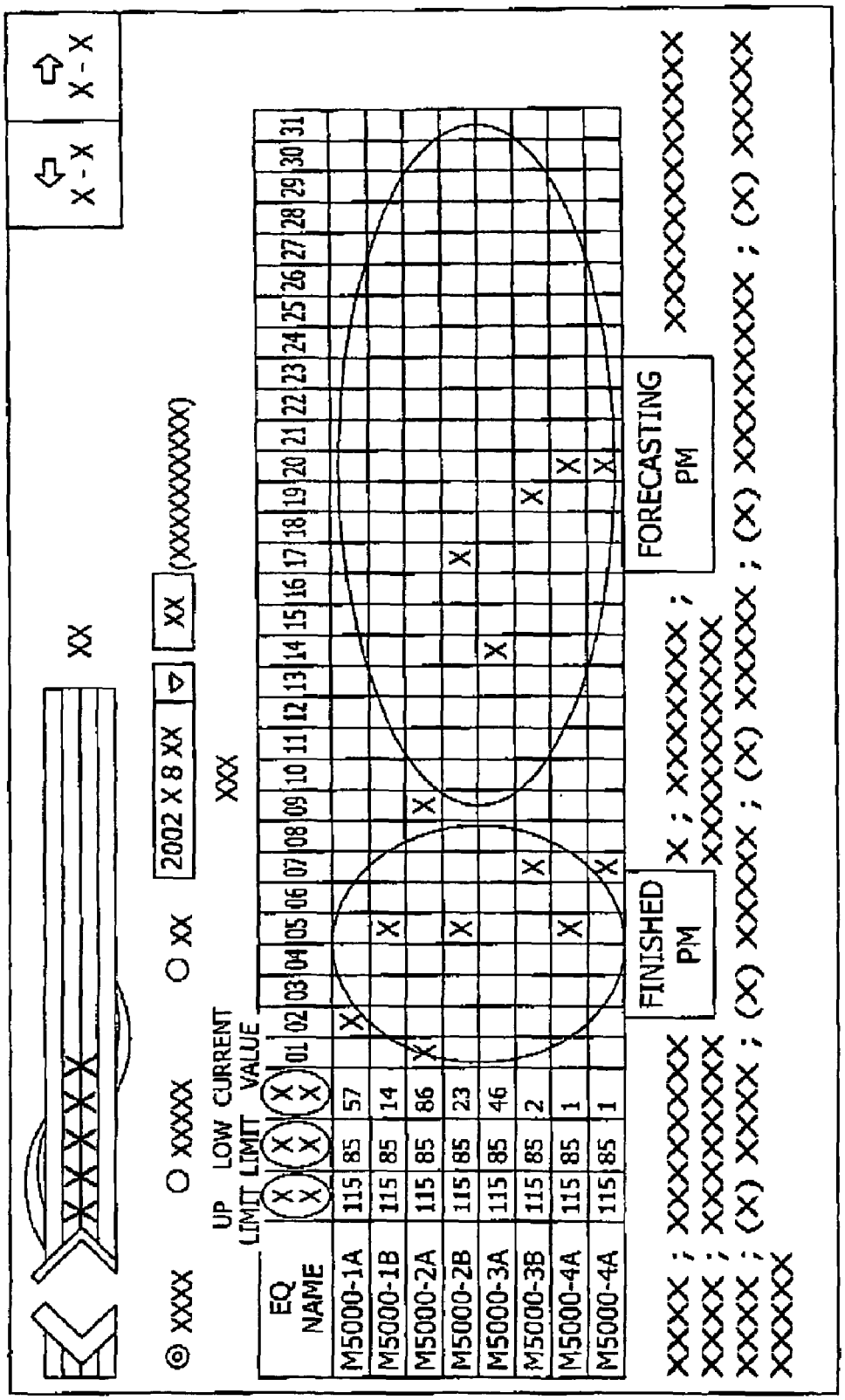
FIG. 16 shows a screenshot of a TEMS implementation for displaying schedules of aperiodic maintenance.

FIG. 16 shows a TEMS function for displaying schedules of aperiodic maintenance. TEMS estimates the next maintenance date by reviewing the daily parameters and finding the duration between the two most current times the parameter changed direction. TEMS will automatically link to the FIM-EIM system and get the items of maintenance for the engineer to maintain and record. Similar to periodic maintenance, TEMS uses the maintenance data that the engineer records to determine whether or not the tool performance is acceptable. If the result of the maintenance yields unacceptable tool performance, TEMS will create a PM OCAP (preventative maintenance out of control action procedure) log for the engineer to notify the user and the manager to cosign. TEMS then forecasts the next maintenance date according to the rules assigned to the system.

Figure 22:
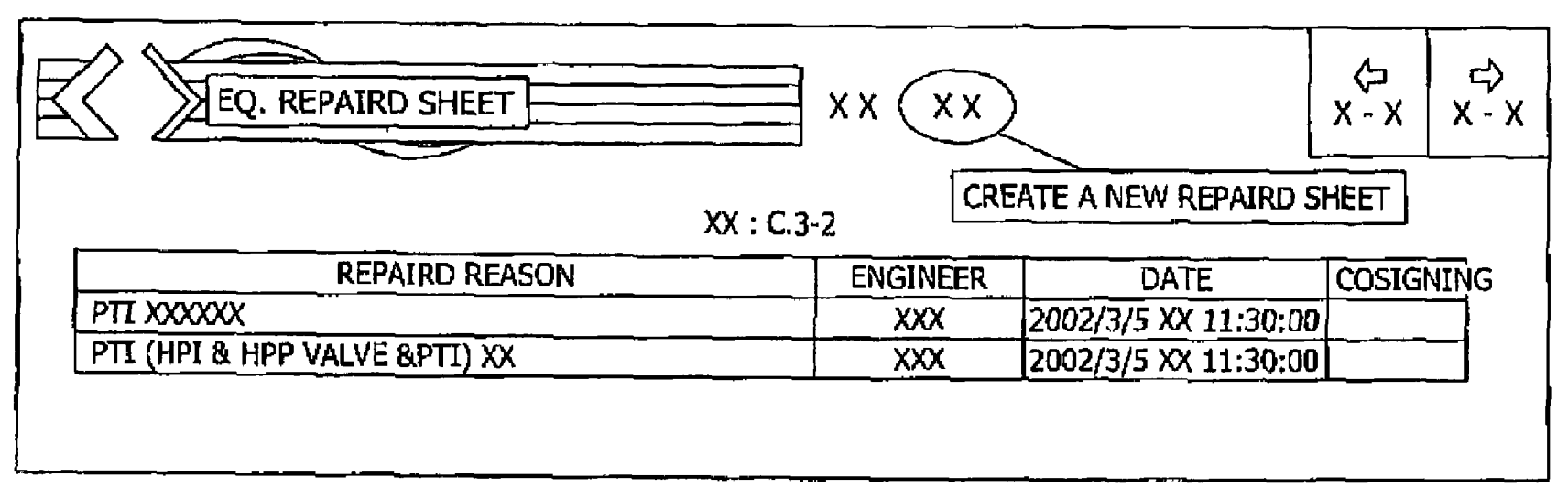

Other types of maintenance include abnormal maintenance, repairing maintenance, daily maintenance, and PM OCAP maintenance. FIG. 19 shows a screenshot of a TEMS embodiment of an abnormal maintenance log. Abnormal maintenance occurs when something out of the ordinary has happened to the equipment, whereby the engineer must repair the equipment by following procedures defined in the FIM-EIM system and recording the maintenance data. FIG. 22 shows an embodiment of a TEMS screenshot for a repairing a maintenance log. If following standard procedures of abnormal maintenance cannot address the issue, then the engineer must record all processes of maintenance and describe the issue in the repairing maintenance log. The repairing maintenance data is stored for future reference.

Figure 20:
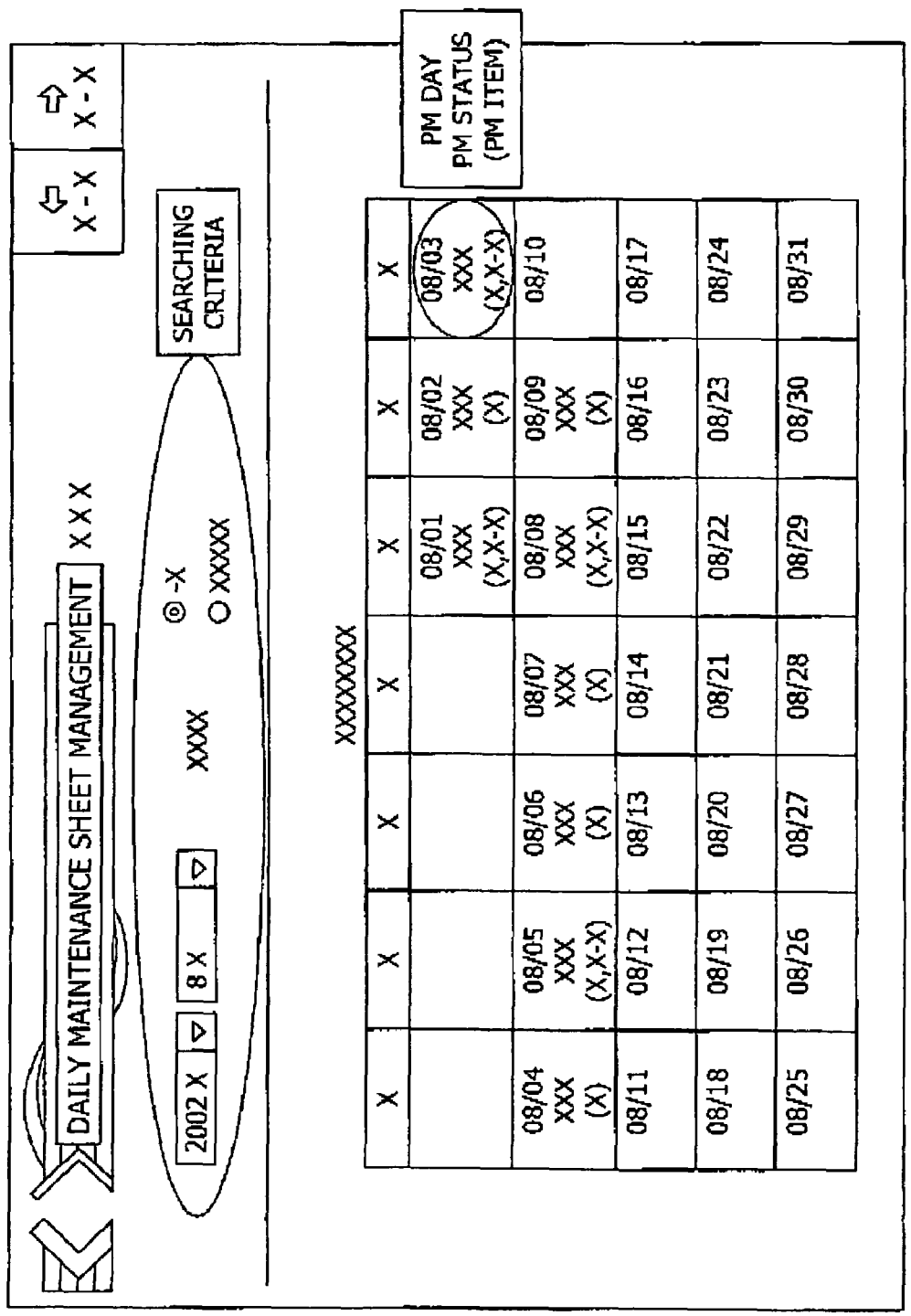
FIG. 20 shows a screenshot of a TEMS implementation of a daily maintenance log.
Figure 21:
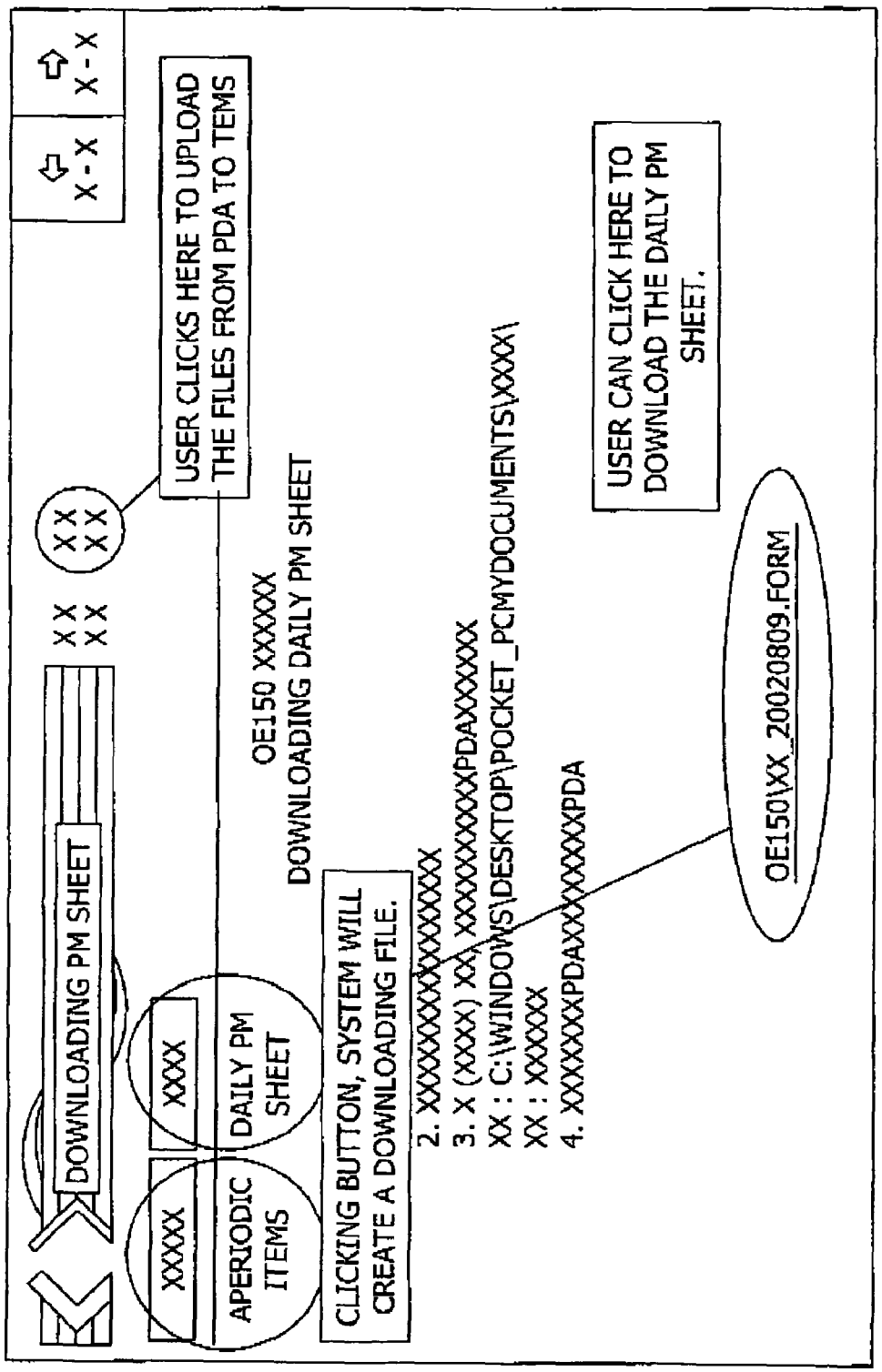
FIG. 21 shows a screenshot of a TEMS implementation for downloading a file of maintenance items.

FIG. 20 shows a screenshot of a TEMS implementation of a daily maintenance log. Daily maintenance differs from periodic maintenance in that daily maintenance must be performed every day, whereas periodic maintenance has a tolerance of one or more days within which the maintenance may be performed. The daily maintenance integrates all of the items for all of the equipment of a given department in one maintenance log. FIG. 21 shows a screenshot of a TEMS implementation for downloading a file of maintenance items. The daily maintenance log can be downloaded to a PDA or accessed via a web-based interface. After finishing the log, the data will be sent to the manager for cosigning. FIG. 23 shows an implementation of an out of control action procedure (OCAP). If the result of any preventative maintenance is failure, TEMS will automatically create a new OCAP of PM and save the failed item to the OCAP of PM. TEMS notifies the engineer to maintain the equipment for this failing item and to record any corrective action data to the OCAP of PM.

TEMS also includes cosigning processes to ensure that management acknowledges all actions. In a preferred embodiment, each action has a cosigning process in TEMS. The user can cosign a document and query a cosigning history of the document. FIG. 24 shows an implementation of a TEMS window for approving the setting of the layers of classes of cosigners. TEMS supports configuration of the cosigning process for the user's needs to satisfy the requirements of each factory. After setting the flow of the cosigning process, the system will follow the flow of the cosigning process in asking the user to set the appropriate cosigners. TEMS creates a list of potential signers from history data that is unique for each user with respect to previous cosigners and requesters. The user can also save the setting time of each chosen cosigner. FIG. 25 shows a screenshot of a TEMS implementation for notifying the user upon system logon when another user is awaiting his or her approval. Each time the user logs into TEMS, it notifies the user of the status of any cosigning documents via a friendly operating interface. In addition, the cosigning subsystem is capable of tracing and querying the history of PM sheets.

TEMS also incorporates programs that execute daily/weekly/monthly reports in a PC server to send electronic mail to managers providing summary information. The programs also send notifications to the appropriate manager when the maintenance dates for equipment are overdue or when the maintenance dates will soon expire. Maintenance status information can also be sent to the manager. Messages are also sent to notify cosigners when the cosigners take too much time to sign a given document.

Another function of TEMS supports two types of files with maintenance items that can be downloaded: 1) daily item of maintenance and 2) parameters of aperiodic maintenance. The engineer uses this function to download the needed maintenance items to a PDA for maintaining and recording data as well as for uploading the maintenance data to the database of the web server. In addition, there are forms of maintenance and items of maintenance described in the FIM-EIM system. The engineer must also follow these items of maintenance and record the results.

Figure 2:
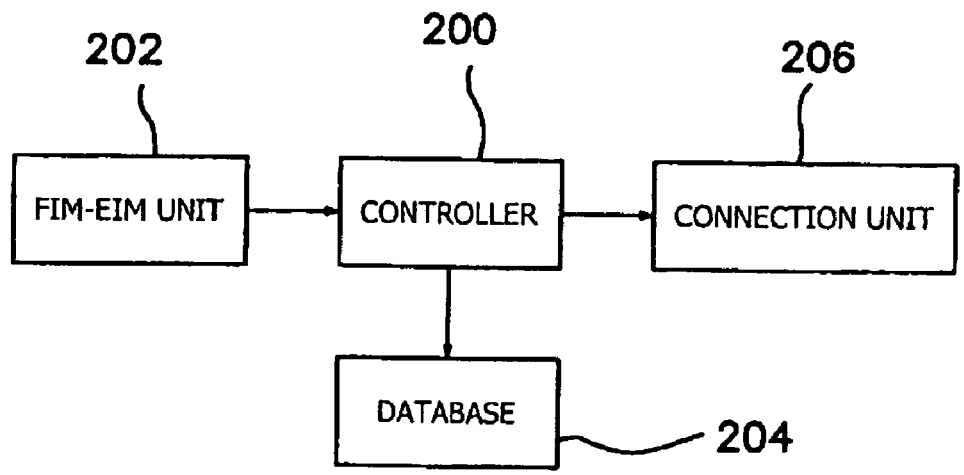
FIG. 2 is a modular diagram representing an apparatus for estimating a maintenance date in accordance with the present invention.
Figure 28:
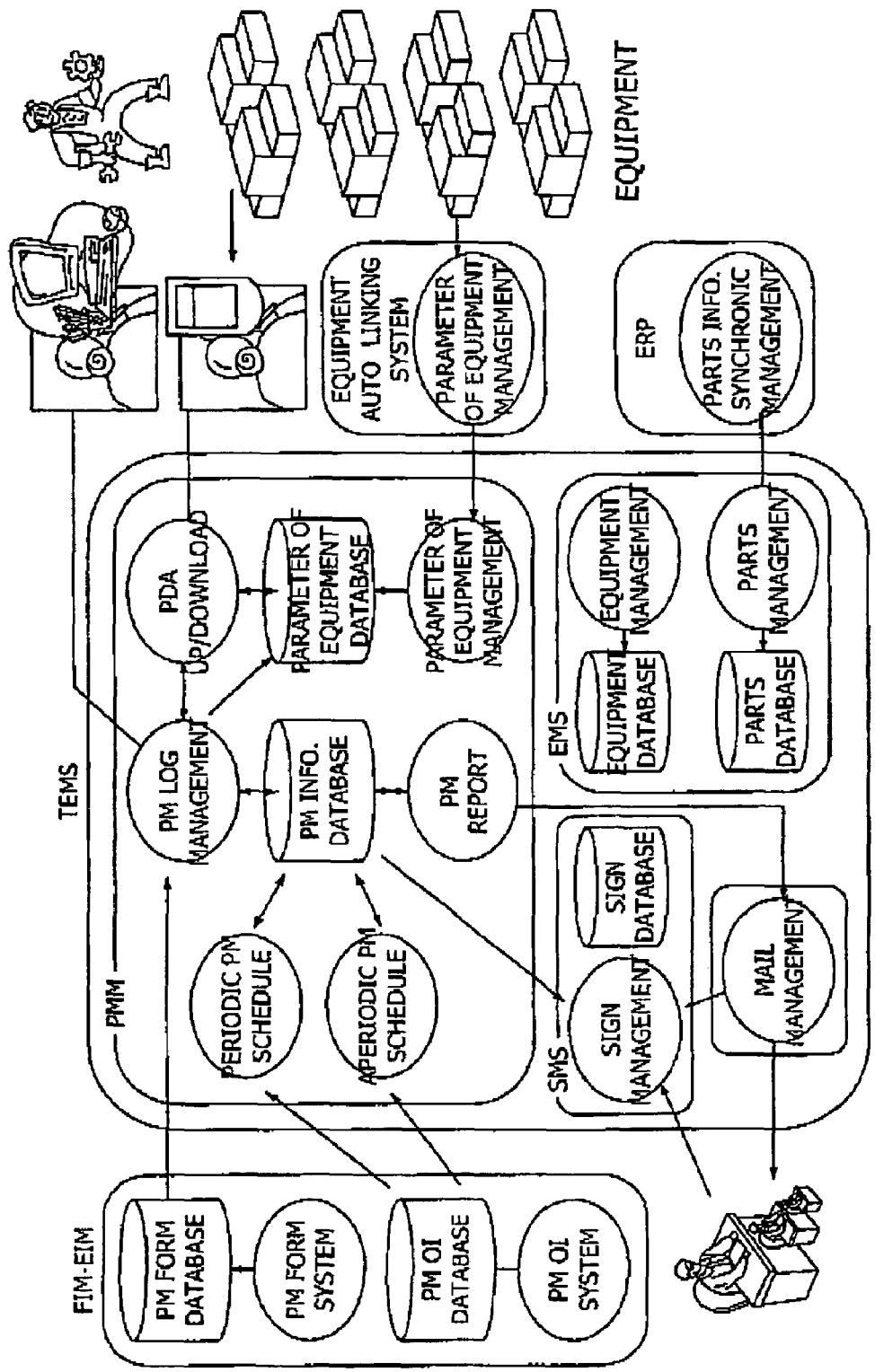
FIG. 28 shows a TEMS system structure.

FIG. 2 is a modular diagram representing an apparatus for estimating a maintenance date according to a third embodiment of the present invention. The apparatus comprises a connection unit 206, a database 204, a FIM-EIM (Fab Information Master-Equipment Information Master) unit 202, and a controller 200, and can be configured to be connected to at least one tool. The connection unit 206 is used to connect a tool to the apparatus to obtain a detected value of a parameter. The detected value of the parameter may also comprise a plurality of detected values of parameters, in which case the connection unit 206 will allow the plurality of detected values to be obtained from the tool. Also, the at least one tool may comprise a plurality of tools. In the illustrated embodiment, the connection unit 206 is an equipment automatic linking system through which the parameter of equipment can be automatically collected and stored to the TEMS system as shown in FIG. 28.

The database 204 stores a variation value that represents change of the parameter per time unit for the tool. When many parameters are being monitored the variation value may comprise a plurality of variation values, wherein each parameter corresponds to its own variation value and the plurality of variation values is stored to database 204. The database 204 also stores the detected values of at least one parameter for the tool. If only one parameter is being tracked for maintenance, the database 204 holds a portion of or all of the detected values for that parameter that have historically been measured for the tool. If multiple parameters are being considered for maintenance, the database 204 will contain a history of detected values for the parameters that are being tracked. The database 204 may also contain a predefined value for each parameter. Maintenance values for each parameter are also stored in database 204.

The controller 200 estimates the maintenance date for the tool according to the variation value from database 204 and a difference between a maintenance value and the detected value as described for example in connection with FIG. 1. If for example the maintenance value minus the detected value is less than or equal to the predefined value, then the tool needs to be maintained. When many parameters are being tracked for maintenance purposes, the difference may comprise a plurality of differences. The controller 200 uses the difference or plurality of differences to estimate the maintenance date. For this process, the controller 200 obtains the detected values from the connection unit 206 and the stored detected values from database 204 to calculate the maintenance date. The controller 200 also takes the new detected values from connection unit 206 and stores them in database 204.

The FIM-EIM (Fab Information Master-Equipment Information Master) unit 202 provides several rules for defining the maintenance date and table, such as the predefined maintenance date or maintenance table. The FIM-EIM unit 202 has a tree sub-system that includes an equipment information system, a preventative maintenance operating instruction (PM OI) system, and a PM form system. The FIM-EIM unit 202 is connected to the controller 200 to store the maintenance date to a maintenance schedule. The FIM-EIM unit 202 also looks for scheduling conflicts with the estimated date received from controller 200 and tries to schedule the maintenance date and time as efficiently as possible. The present invention utilizes the statistics to estimate the changes occurring on the tools according to the known parameters. Therefore, the maintenance date can be estimated, and the maintenance schedule can be set up accordingly.

In view of the foregoing, it will be understood by those skilled in the art that the methods of the present invention can facilitate formation of maintenance schedules, and in particular maintenance schedules for semiconductor manufacturing equipment. The above-described embodiments have been provided by way of example, and the present invention is not limited to these examples. Multiple variations and modifications to the disclosed embodiments will occur to the extent not mutually exclusive to those skilled in the art upon consideration of the foregoing description. Additionally, other combinations, omissions, substitutions and modifications will be apparent to the skilled artisan in view of the disclosure herein. Accordingly, the present invention is not intended to be limited by the disclosed embodiments, but is to be defined by reference to the appended claims.

What is claimed is:

1. A method of estimating a maintenance date for a tool based upon a parameter of the tool, comprising:
   obtaining a difference between a detected value of the parameter and a maintenance value of the parameter;
   determining whether the difference is less than or equal to a predefined value;
   performing a maintenance procedure if the difference is less than or equal to the predefined value;
   estimating a maintenance date according to the difference and a variation value if the difference is greater than the predefined value, the variation value representing a change in the parameter per time unit; and
   storing the maintenance date to a maintenance schedule for later use; wherein the maintenance date is estimated by adding (a) a current date, (b) one, and (c) the difference divided by the variety value.

2. The method of claim 1, wherein the variation value is determined by a statistical method.

3. The method of claim 1, wherein the variation value is calculated from stored data.

4. The method of claim 3, wherein the variation value is calculated from data corresponding to detected values of the parameter which were obtained from the tool over a period of time prior to the estimating of a maintenance date.

5. The method of claim 4, wherein the obtaining, the determining and the performing are performed automatically.

6. The method of claim 4, wherein the period of time is a plurality of days.

7. The method of claim 3, wherein the variation value is calculated from data obtained in previous maintenance date estimates.

8. The method of claim 1, wherein the variation value is calculated from data corresponding to detected values of the parameter which were obtained from the tool over a period of time.

9. The method of claim 1, wherein the variation value is calculated from data immediately inputted by a user.

10. The method of claim 1, wherein the variation value is calculated from stored data and data immediately inputted by a user.

11. A method for estimating a maintenance date for a tool, comprising:
    obtaining a plurality of differences between a plurality of detected values of a plurality of parameters of the tool and a plurality of maintenance values of the parameters;
    determining whether each difference is less than or equal to a corresponding predefined value for each parameter,
    performing a maintenance procedure if a predetermined number of the differences are less than or equal to their corresponding predefined values;
    estimating a maintenance date according to the differences and a plurality of variation values for each parameter if the predetermined number of the differences are not less than or equal to their corresponding predefined values; wherein each variation value represents a change in a corresponding one of the parameters per time unit for the tool; and storing the maintenance date to a maintenance schedule for later use; wherein the maintenance date is estimated by adding (a) a current date, (b) one, and (c) the difference divided by the variety value.

12. The method of claim 11, wherein: the predetermined number is equal to one; and the maintenance date is stored to a maintenance schedule.

13. The method of claim 11, wherein each variation value is calculated from data corresponding to detected values of the corresponding parameters which were obtained from the tool over a period of time prior to the estimating of a maintenance date.

14. The method of claim 13, wherein the variation values are calculated from stored data.

15. The method of claim 13, wherein the period of time is a plurality of days.

16. The method of claim 11, wherein the variation values are calculated from data immediately inputted by users.

17. The method of claim 11, wherein the variation values are determined by a statistical method.

18. The method of claim 11, wherein each of the variation values represents a change of the corresponding parameter per time unit.

19. An apparatus for estimating a maintenance date for a tool, comprising: a database comprising at least one variation value, each variation value represents a change of a parameter of the tool per time unit; and a controller operatively connected to the database and configured to estimate the maintenance date for the tool according to at least one variation value and at least one difference between a detected value of the parameter and a maintenance value of the parameter; wherein the controller is configured to provide a recommendation that a maintenance procedure be performed on the tool when the difference is less than or equal to a predefined value wherein the maintenance date is estimated by adding (a) a current date, (b) one, and (c) the difference divided by the variety value.

20. The apparatus of claim 19, wherein the apparatus further comprises a connection unit, which is connected between the tool and the apparatus and which is configured to obtain the detected value of the parameter from the tool.

21. The apparatus of claim 20, wherein the apparatus further comprises a fab information master-equipment information master unit connected to the controller to store the maintenance date to a maintenance schedule.

22. The apparatus of claim 19, wherein the controller is configured to estimate the maintenance date for the tool according to a plurality of variation values and a plurality of differences between a plurality of maintenance values of the parameters and a plurality of detected values of the parameters.

* * * * *